United States Patent
Hochman

(10) Patent No.: US 9,864,561 B2
(45) Date of Patent: Jan. 9, 2018

(54) DEVICES FOR CREATING MOSAICKED DISPLAY SYSTEMS, AND DISPLAY MOSAIC SYSTEMS COMPRISING SAME

(71) Applicant: Revolution Display, LLC, Glendale, CA (US)

(72) Inventor: Jeremy Hochman, Walnut, CA (US)

(73) Assignee: Revolution Display, LLC, Glendale, CA (US)

( * ) Notice: Subject to any disclaimer, the term of this patent is extended or adjusted under 35 U.S.C. 154(b) by 0 days.

(21) Appl. No.: 15/485,421

(22) Filed: Apr. 12, 2017

(65) Prior Publication Data
US 2017/0220310 A1    Aug. 3, 2017

Related U.S. Application Data

(60) Continuation-in-part of application No. 15/291,684, filed on Oct. 12, 2016, now Pat. No. 9,660,403, which
(Continued)

(51) Int. Cl.
*G06F 3/14*    (2006.01)
*G09G 5/00*    (2006.01)
(Continued)

(52) U.S. Cl.
CPC ............ *G06F 3/1446* (2013.01); *G06F 3/147* (2013.01); *G09G 5/006* (2013.01);
(Continued)

(58) Field of Classification Search
CPC .............. H01R 31/065; H01R 13/2407; H01R 13/504; H01R 13/506; H01R 13/665;
(Continued)

(56) References Cited

U.S. PATENT DOCUMENTS

D528,996 S    9/2006  Egawa
7,355,562 B2  4/2008  Schubert et al.
(Continued)

FOREIGN PATENT DOCUMENTS

CN    102819987 A    12/2012
CN    204178647 U    2/2015
(Continued)

OTHER PUBLICATIONS https://resin.io/blog/good-better-beast-week-3/ (Last viewed Jun. 20, 2012).
(Continued)

*Primary Examiner* — Edwin A. Leon
(74) *Attorney, Agent, or Firm* — Downs Rachlin Martin PLLC

(57) ABSTRACT

Discrete electronic modules, such as display tiles, designed and configured to be mosaicked and operatively connected with one another and/or to one or more differing types of discrete electronic modules. In some embodiments, the electronic modules are electrically connected together using electrical connector units that are separate and distinct from the electronic modules. In some embodiments, the connector units are connector biscuits. In some embodiments, the connector units are hub connectors. Connector units of the present disclosure can be designed and configured to allow an electronic module connected thereby and part of a panel of display tiles to be installed and removed by moving the module only in a direction normal to a viewing face of the panel at that module.

25 Claims, 15 Drawing Sheets

Related U.S. Application Data is a division of application No. 15/017,865, filed on Feb. 8, 2016, now Pat. No. 9,477,438.

(60) Provisional application No. 62/232,839, filed on Sep. 25, 2015.

(51) Int. Cl.

| | | |
|---|---|---|
| *G06F 3/147* | (2006.01) | |
| *H01R 12/73* | (2011.01) | |
| *H01R 12/72* | (2011.01) | |
| *H01R 13/62* | (2006.01) | |
| *H01R 25/00* | (2006.01) | |
| *H01R 12/70* | (2011.01) | |
| *G09G 5/02* | (2006.01) | |

(52) U.S. Cl.
CPC ....... *H01R 12/7076* (2013.01); *H01R 12/727* (2013.01); *H01R 12/732* (2013.01); *H01R 13/6205* (2013.01); *H01R 25/00* (2013.01); *G09G 5/02* (2013.01); *G09G 2300/026* (2013.01); *G09G 2320/0666* (2013.01); *G09G 2330/021* (2013.01)

(58) Field of Classification Search
CPC ............ H01R 13/6691; H01R 12/7076; H01R 12/727; H01R 12/732; H01R 13/6205; H01R 25/00; G06F 3/1446; G06F 3/147; G09G 5/006; G09G 5/02; G09G 2300/026; G09G 2320/0666
USPC .............................................. 439/39; 345/1.3
See application file for complete search history.

(56) References Cited

U.S. PATENT DOCUMENTS

| | | | |
|---|---|---|---|
| D573,553 S | 7/2008 | Uemoto et al. | |
| D577,690 S | 9/2008 | Shida et al. | |
| D581,380 S | 11/2008 | Derocher et al. | |
| D590,789 S | 4/2009 | Pozin et al. | |
| D598,401 S | 8/2009 | Takada et al. | |
| D622,876 S | 8/2010 | Takahashi et al. | |
| D636,899 S | 4/2011 | Shibahara | |
| 8,136,277 B2 | 3/2012 | Patterson et al. | |
| 8,197,088 B2 | 6/2012 | Patterson et al. | |
| D672,168 S | 12/2012 | Davis | |
| D683,482 S | 5/2013 | Bierhuizen et al. | |
| 8,485,689 B2 | 7/2013 | Patterson et al. | |
| 9,477,438 B1* | 10/2016 | Hochman ................. | G09G 5/02 |
| D771,844 S | 11/2016 | Hochman et al. | |
| 9,660,403 B2 | 5/2017 | Hochman et al. | |
| 2003/0069891 A1 | 4/2003 | McClintock et al. | |
| 2005/0178034 A1 | 8/2005 | Schubert et al. | |
| 2005/0248935 A1 | 11/2005 | Strip | |
| 2008/0037284 A1 | 2/2008 | Rudisill | |
| 2008/0141572 A1 | 6/2008 | Tomich et al. | |
| 2008/0220632 A1* | 9/2008 | Chang .................. | H01R 13/514 439/74 |
| 2008/0220655 A1* | 9/2008 | Liao ....................... | H01R 13/22 439/629 |
| 2008/0280464 A1* | 11/2008 | Hsu ...................... | H01R 13/502 439/71 |
| 2009/0310065 A1 | 12/2009 | Dunn | |
| 2010/0223857 A1 | 9/2010 | Sutton et al. | |
| 2012/0038619 A1 | 2/2012 | Shraga et al. | |
| 2012/0159819 A1 | 6/2012 | Patterson et al. | |
| 2013/0181884 A1 | 7/2013 | Perkins et al. | |
| 2013/0269882 A1 | 10/2013 | Bauman et al. | |
| 2014/0137384 A1 | 5/2014 | Patterson et al. | |
| 2015/0084837 A1 | 3/2015 | Mese | |
| 2015/0301781 A1 | 10/2015 | Ekkaia et al. | |
| 2016/0014489 A1 | 1/2016 | Davis et al. | |
| 2017/0093106 A1 | 3/2017 | Hochman et al. | |

FOREIGN PATENT DOCUMENTS

| | | |
|---|---|---|
| WO | 2009069076 A2 | 6/2009 |
| WO | 2014070684 A1 | 5/2014 |

OTHER PUBLICATIONS http://www.led-lightlink.com/4-2-1-led-video-floor.html/139030 (Last viewed on Jun. 20, 2016).
http://otssigns.net/blog/ (Last viewed on Jun. 20, 2016).
https://iceledscreens.wordpress.com/2013/06/11/building-your-massive-led-screen-strip-by-strip/ (Last viewed on Jun. 20, 2016).
https://www.christiedigital.com/en-us/digital-signage/products/microtiles (Last viewed on Jun. 20, 2016).
http://www.verypixel.com/service/LED_Display_Installation.html (Last viewed on Jun. 20, 2016).
http://www.ledinside.com/knowledge/2015/6/led_signage_industry_adapt_or_die (Last viewed on Jun. 20, 2016).
http://www.ergotron.com/ProductsDetails/tabid/65/PRDID/791/language/hi-IN/Default.aspx (Last viewed on Jun. 20, 2016).
http://www.audipack.com/products/rid/98959/prid/74238/pmame/flat_panel_video_wall_floor_stand_quick_release.html (Last viewed on Jun. 20, 2016).
http://www.bbslighting.com/products/area-48-led-detachable-bamdoor-frame (Last viewed on Jun. 20, 2016).
https://web.archive.org/web/20160616231057/http://www.dgiled.com/product_show.asp?id=352&dasid=117&Immc=DGiLED+UHD+Tiles (Jun. 16, 2016).
https://web.archive.org/web/20151124042701/http://www.absen.com/pro/detail_101029001004_100000121043229.html (Nov. 24, 2015).
Non-final Office Action dated Jun. 20, 2016, issued in connection with U.S. Appl. No. 15/017,865, filed Feb. 3, 2016, Hochman.
Amendment and Response to First Non-Final Office Action dated Jul. 21, 2016, filed in connection with U.S. Appl. No. 15/017,865, filed Feb. 8, 2016, Hochman.
Notice of Allowance dated Aug. 25, 2016, issued in connection with U.S. Appl. No. 15/017,865, filed Feb. 3, 2016, Hochman.
Non-final Office Action dated Nov. 23, 2016, issued in connection with U.S. Appl. No. 15/291,684, filed Oct. 12, 2016, Hochman.
Notice of Allowance dated Feb. 8, 2017, issued in connection with U.S. Appl. No. 15/291,684, filed Oct. 12, 2016, Hochman.
Extended European Search Report dated Jan. 25, 2017, in connection with European Patent Application No. 16168934.4, filed May 10, 2016.
Extended European Search Report dated Jan. 25, 2017, in connection with European Patent Application No. 16168945.0, filed May 10, 2016.
Extended European Search Report dated Jan. 25, 2017, in connection with European Patent Application No. 16168956.7, filed May 10, 2016.

* cited by examiner

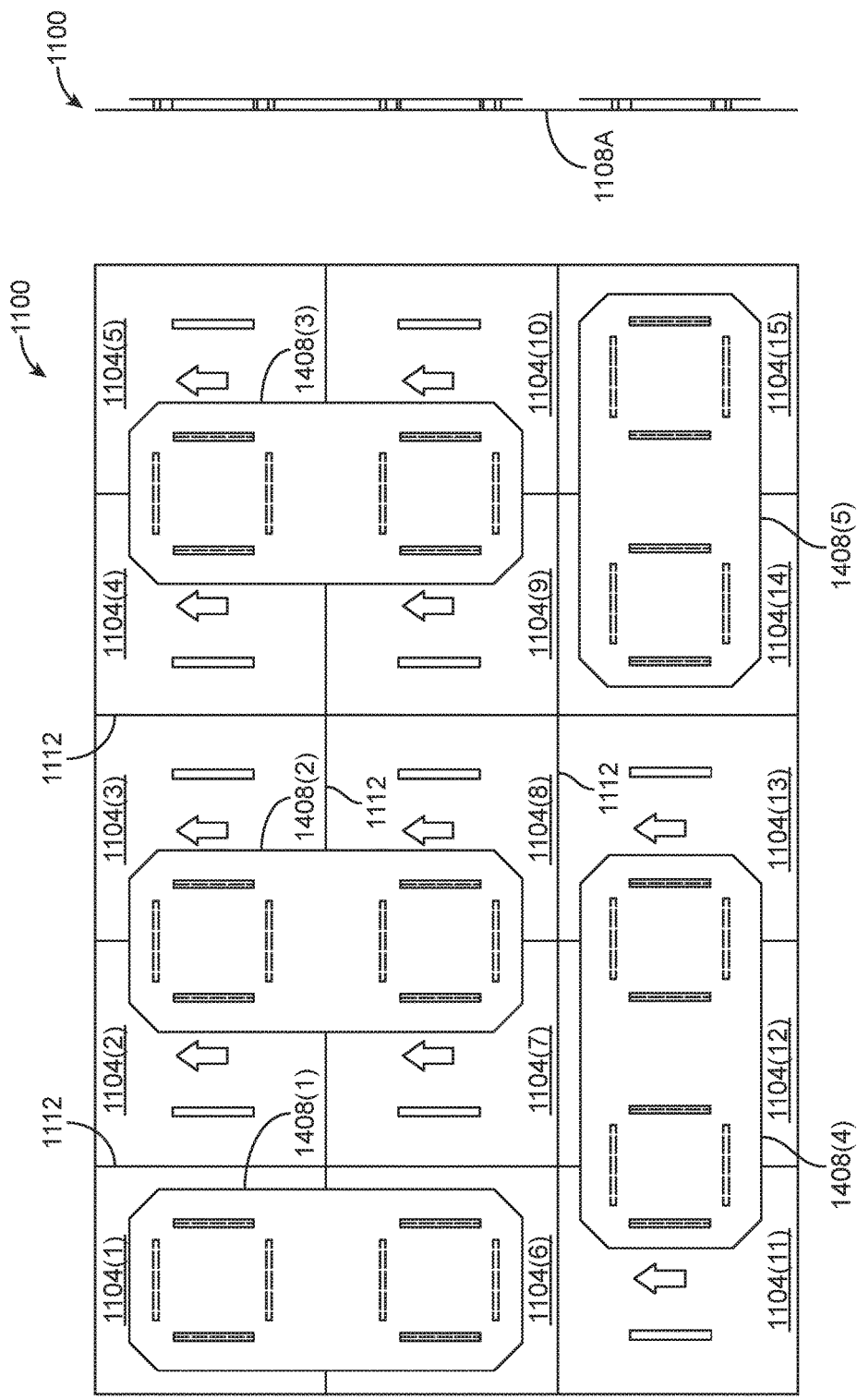

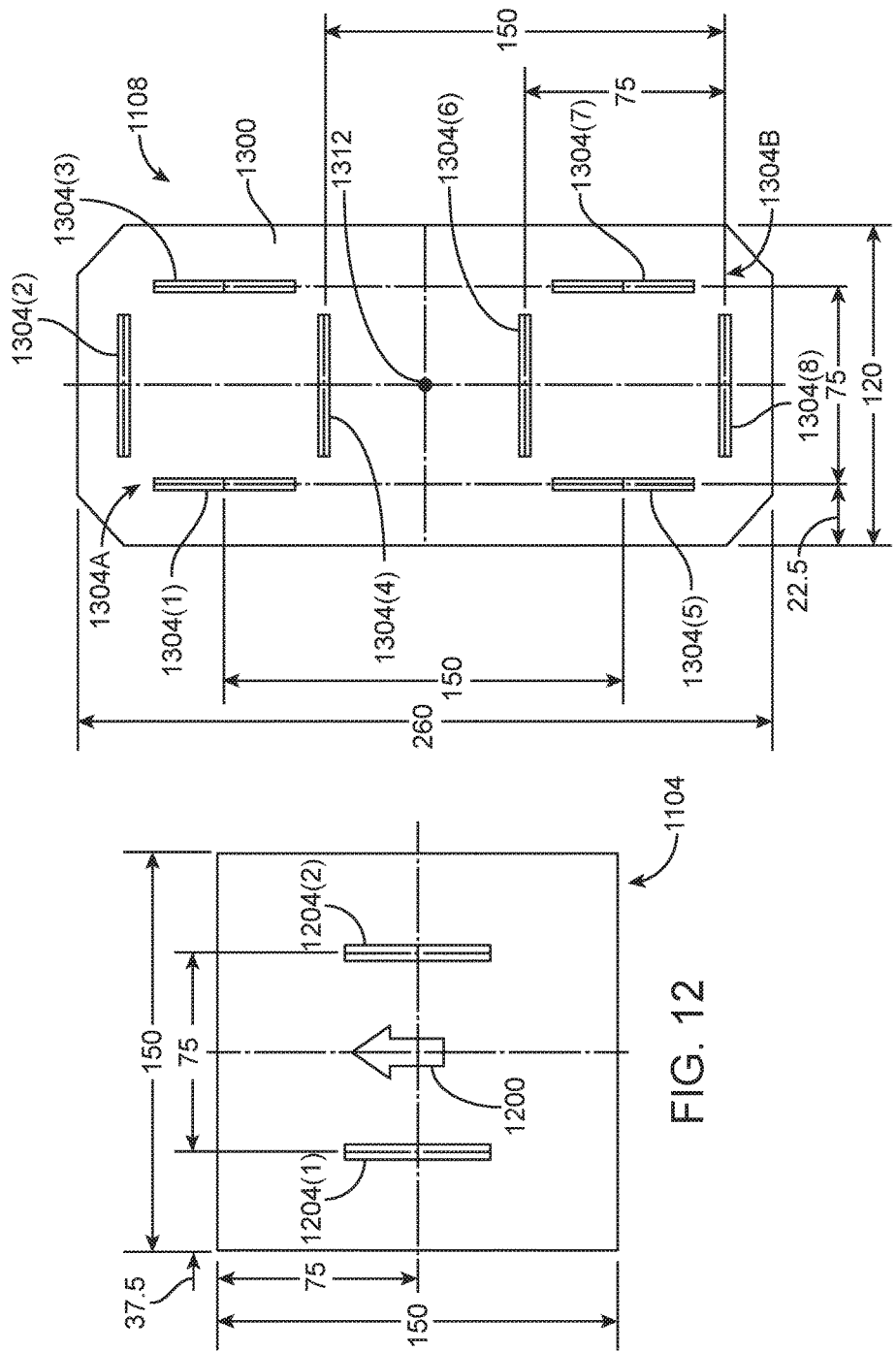

DEVICES FOR CREATING MOSAICKED DISPLAY SYSTEMS, AND DISPLAY MOSAIC SYSTEMS COMPRISING SAME

RELATED APPLICATION DATA

This application is a continuation-in-part of U.S. patent application Ser. No. 15/291,684, filed on Oct. 12, 2016, and titled "CONNECTOR FOR DEVICES FOR CREATING MOSAICKED DISPLAY SYSTEMS, AND DISPLAY MOSAIC SYSTEMS COMPRISING SAME", which is a divisional of U.S. patent application Ser. No. 15/017,865, filed on Feb. 8, 2016, (now U.S. Pat. No. 9,477,438, issued Oct. 25, 2016) and titled "DEVICES FOR CREATING MOSAICKED DISPLAY SYSTEMS, AND DISPLAY MOSAIC SYSTEMS COMPRISING SAME", which is a nonprovisional application of U.S. Provisional Patent Application Ser. No. 62/232,839, filed on Sep. 25, 2015, and titled "ELECTRICAL CONNECTOR BISCUITS AND MODULAR ELECTRONICS UTILIZING SAME." Each of these applications is incorporated herein by reference in its entirety.

FIELD OF THE INVENTION

The present invention generally relates to the field of modular electronics. In particular, the present invention is directed to devices for creating mosaicked display systems, and display mosaic systems comprising same.

BACKGROUND

Modular electronics, i.e., electronic systems composed of discrete components that are electrically connected together to form an overall system, are used in a variety of applications. For example, large electronics graphical displays, such as video screens for stadiums and other large performance venues, electronic advertising billboards, and other electronic displays are often composed of display modules, or "display tiles," that are assembled into large arrays or mosaics that form an overall composite electronic display. Present means for securing discrete display tiles to support structures typically involve mechanical fastening of one sort or another, and present means for electrically connecting the discrete tiles to display controllers often involve separate wiring harnesses and/or electrical connectors that require the tiles to be in a specific rotational orientation.

SUMMARY OF THE DISCLOSURE

In an implementation, the present disclosure is directed to an electronic display system, which includes a plurality of display tiles designed and configured to abut one another so as to form a mosaicked display when the display tiles are deployed in the mosaicked display, the mosaicked display having a viewing face, wherein each display tile includes onboard electronics for operating the display tile; a periphery designed and configured to conformally abut a like periphery of another one of the display tiles; a first front side that forms part of the viewing side of the mosaicked display when the display tile is deployed in the mosaicked display; a first backside spaced from the first front side; and first and second electrical connection interfaces located on the first backside and spaced from one another, wherein the first and second electrical interface points provide redundant electrical connectivity to the onboard electronics; and a plurality of connector units separate and distinct from one another and from each of the plurality of display tiles, wherein each connector unit includes a second front side designed and configured to confront at least a pair of the display tiles when the connector unit is deployed for use in the mosaicked display; and third and fourth electrical connection interfaces located on the second front side and arranged to functionally engage corresponding respective ones of the first and second electrical connection interfaces of a pair of the display tiles when the connector unit is deployed for use in the mosaicked display; wherein, when the plurality of display tiles and the plurality of connector units are deployed to form the mosaicked display, any one of the display tiles can be removed from the mosaic display and disengaged from at least one of the connector units by moving the display tile only in a direction normal to the viewing face of the mosaicked display at the display tile.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 11A is an elevational view of the backside of a mosaicked display made up of display tiles connected together using connector units of the hub-type made in accordance with the present disclosure, wherein the display tiles are orientation sensitive;

FIG. 11B is an elevational view of a side of the mosaicked display of FIG. 11A;

FIG. 12 is an enlarged rear view of one of the electronic tile modules of the mosaicked display of FIGS. 11A and 11B;

FIG. 13 is an enlarged front view of one of the hub connectors of the mosaicked display of FIGS. 11A and 11B;

DETAILED DESCRIPTION

General Description

Figure 1A:
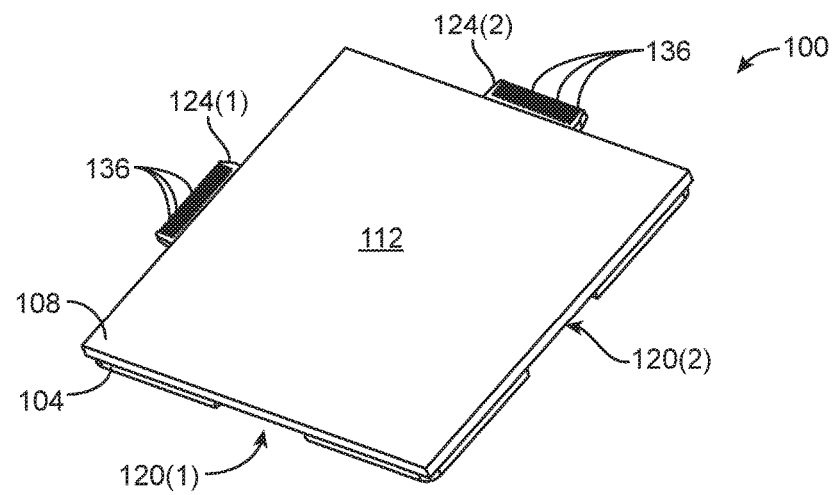
FIG. 1A is an isometric view of an exemplary display tile made in accordance with the present disclosure, showing the front face of the tile and two connector units of the biscuit type engaged with the two recessed receptacles.

In some aspects, the present disclosure is directed to modular electronic systems composed of a plurality of discrete electronic modules, such as a plurality of discrete display tiles and/or a plurality of discrete controller modules, that are operatively connected to one another using one or more connector units that convey power and/or other signals, such as video signals, calibration signals, color control signals, etc., from one module to another module and/or from one or more controllers to one or more modules. Depending on the configurations of the electronic modules and connector units, the use of connector units can have a variety of benefits, a number of which are illustrated herein.

In some embodiments, the discrete electronic modules are display tiles for composing a display mosaic. Each such display tile can contain one or more light-emitting or non-light-emitting elements forming one or more, or many, pixels or portion(s) of one or more pixels, of a large composite display (e.g., a video display or other graphical display) or forming a portion of a larger composite non-graphical-type light-emitting mosaic. For the sake of convenience, a group of discrete electronic modules clustered together in working relationship is referred to herein as a "mosaic," with the discrete electronic modules being likened to the tiles of an artistic tile mosaic. However, for the purposes of this disclosure and the present claims, the use of the term "mosaic" and like terms should not be construed to include other limitations that the term may imply. Rather, its use herein and in the appended claims is limited to the discrete electronic modules, for example, display tiles, being deployed and connected to one another to form a working grouping of such modules, regardless of the shapes and/or character of the individual modules. Also for convenience, the term "illumination" is used herein and in the appended claims to distinguish display elements and display mosaics not functioning as video or other graphical display devices, such as general lighting and backlighting, from video and graphical display devices that display images electronically via image signals. Complementarily, the term "display" is used herein and in the appended claims to denote video and graphical display devices that display images electronically via image signals as well as illumination devices. Consequently, both graphical display devices and illumination display devices are species of the genus "display devices."

Examples of mosaicked displays that can be made using graphical display tiles of the present disclosure include, but are not limited to, electronic video displays, electronic scoreboards, electronic billboards, electronic signage, electronic collages, touchscreen displays (based on any suitable touchscreen technology), and any combination thereof. By "electronic collage" it is meant that each display tile or subset of multiple display tiles in the collage, displays a full image (e.g., a first photograph), while another display tile or other subsets of tiles displays a different full image (e.g., a second photograph different from the first photograph). Each display element of each graphical display tile may be any display element suitable for the graphical display at issue, including light-emitting elements (e.g., backlit, side-lit, emissive, etc.) and non-light-emitting elements (e.g., reflective). Examples of light-emitting elements include liquid-crystal display (LCD) devices, electronic-paper display devices, plasma display devices, light-emitting-diode (LED) display devices, incandescent display devices, and rear-projection display devices (such as display devices based on digital light processors (DLPs)), among others. Examples of non-light emitting elements include reflective displays, such as cholesteric LCD, electrophoretic displays, electrochromic displays, electrowetting, light refraction, interference, and/or diffraction displays, among others. Examples of illumination display mosaics include panels for photographic and cinematographic lighting, room-illumination, decorative illumination, and backlighting for fixed graphical displays. Each illumination display element of each such display tile may include one or more back-lighting devices, such as one or more LED panels, one or more edge-lighting devices, such as LED strips, one or more light-emitting-capacitor panels, and incandescent devices, among others. Fundamentally, there is no limitation on the technology(ies) of the display element(s) that can be included in a display tile of the present disclosure other than that it/they can be implemented in tile form.

In some embodiments, the discrete electronic modules are designed and configured to be attached to a suitable support structure, which may include a flat, curved, or otherwise shaped substrate, lattice-style grid, or other structure, using any of a variety of attachment means, such as magnetic attraction, adhesive bonding, or mechanical fastening, among others, and any suitable combination thereof. It should be appreciated that fundamentally there is no limitation on the support structure. For example, it can be a wall, ceiling, floor, or other component of a building or other fixed or moving habitable structure (e.g., ship, aircraft, dirigible, etc.), or it can be a commodity article of manufacture (e.g., refrigerator) or a custom-built structure built specifically for supporting the discrete electronic modules at issue, among many others that are too numerous to mention. In some embodiments, the support structure is composed of sheet stock comprising a non-magnetized ferromagnetic material (e.g., steel), to which the electronic modules are attached by magnetic attraction of at least some of the discrete electronic modules to the ferromagnetic support structure. This can be accomplished, for example, by providing some or all of the discrete electronic modules with one or more permanent magnets that attract such outfitted modules to the non-magnetized ferromagnetic support structure. In some embodiments, the support structure can be composed at least partially of one or more magnetized ferromagnetic materials, and some or all of the discrete electronic modules may each contain non-magnetized ferromagnetic material for attracting such outfitted modules to the magnetized support structure. As noted above, while magnetic attraction can be used for attaching the discrete electronic modules to a support structure, other attachment means can be used. Examples of other attachment means include adhesive strips, hook-and-loop fasteners, double-sided tape, push-snap-button mechanisms, and snap-clips, among others.

In some aspects, the present disclosure is directed to discrete electronic modules each having at least one peripheral edge designed and configured to abut or confront a like-shaped peripheral edge of another electronic module. Correspondingly, connector units of the present disclosure are designed and configured to engage adjacent electronic modules so as to allow the electronic modules to directly abut one another along their conformally-shaped peripheral edges, while also allowing each of the electronic modules to be installed and removed in a direction only normal to the front faces of the electronic modules. As described below in detail, two types of connector units are referred to herein as "connector biscuits" and "hub connectors" because of their unique characteristics. However, those skilled in the art will readily appreciate the features these two types of connector units have in common, such as each being completely separate, distinct, and physically independent relative to the electronic modules and other connector units prior to installation, allowing the electronic modules to closely abut one another yet be installed in a direction normal to the front faces of the electronic modules and allowing the connector units to be completely hidden from view from the front side of the connected electronic modules in a mosaicked system composed of such electronic modules and connector units. Each of the biscuit and hub-connector types of connector units are illustrated in the accompanying drawings and described below in detail.

In the context of biscuit-type connector units, the abutting/confronting edges of the electronic modules each include at least one recessed receptacle designed and configured to receive a connector unit that operatively connects together the abutting/confronting electronic modules and/or operatively connects electronic modules with control/power electronics. In addition, connector units can also be designed and configured to aid in properly aligning the electronic modules with one another. In some embodiments, each electronic module is a display tile that can be configured, for example, for either a graphical display mosaic or an illumination display mosaic, as desired. In some instantiations, such display tiles can be of any desired size and shape, as long as peripheral edges desired to abut with one another are suitably shaped for conformal abutment/confrontment with one another. Shapes can include rectangular (e.g., square), hexagonal, triangular, stair-step, wavy, zigzag, etc.—virtually any shape(s) that can conformally abut/confront one another. In some instantiations, all of the display tiles for a particular application can be of the same size, while in other instantiations they can be of differing sizes. In some instantiations, the display devices of all of the display tiles can be the same, or they can differ at a designer's will. It is noted that this type of connector unit is conveniently referred to as a "biscuit" due to similarities to biscuits used in woodworking joinery that can be used to connect-together and align adjacent pieces of wood along their edges. With woodworking biscuits used this way, each biscuit is separate from and physically unconnected to the joined pieces of wood prior to installation, engages corresponding receptacles in the two pieces of wood, and is hidden from view in the final assembly, just like with the connector biscuits disclosed herein. A difference, however, between woodworking biscuits and connector biscuits of the present disclosure is that with woodworking biscuits the wood pieces are engaged with the biscuit by moving the wood pieces toward one another because the receptacles are not open to either the front sides or backsides of the wood pieces, whereas with the connector biscuits of the present disclosure, the receptacles are open to the backsides of the electrical modules to allow the installation functionality noted above.

In some embodiments utilizing connector biscuits, as few as one peripheral edge per display tile may be provided with one or more recessed receptacles each for receiving a portion of a corresponding connector biscuit, while in other embodiments, two, three, etc., or all peripheral edges may each have one or more recessed receptacles each for receiving a portion of a corresponding connector biscuit. It is noted that utilizing connector biscuits of the present disclosure means that only recessed receptacles need to be provided on the discrete electronic modules, and this can lead to display tiles (or other discrete electrical modules) having peripheral edges that are smooth and/or free of any projections, which makes for easy handling, packing, and shipping, as well as allowing for simple installation and removal without the need to disturb adjacent modules. It is also noted that for display tiles that are rotationally symmetric, such as square, and have the same numbers of recessed receptacles on all peripheral edges, the tiles may be configured so that they can be installed in any particular mosaic in any rotational orientation. As will be seen from examples illustrated in the attached drawings and described below, a recessed receptacle of the present disclosure need not necessarily be bounded by parts of the corresponding discrete electronic module on all sides. For example and as illustrated in the accompanying drawings, a recessed receptacle of the present disclosure is defined by a recess formed in a back face of a discrete electronic module and along a peripheral edge of the electronic module.

In the context of hub-type connector units, the abutting/confronting edges of the electronic modules do not require the recessed rear receptacles needed for embodiments of the biscuit-type connector units. Rather and as illustrated in the appended drawings and described below, each hub connector includes a plurality of electrical connector components designed, configured, and located to engage corresponding complementary electrical connector components on the electronic modules. In some embodiments, the complementary electrical connector components are male and female electrical connector components that engage one another to form a friction fit that firmly holds the electronic modules to the hub connector. In some embodiments, the complementary electrical connector components may not provide such firm friction fit, such that additional holding means are required to hold the electronic modules firmly to the hub connector. Examples of such holding means include but are not limited to, snap-fit connectors, magnets, hook-and-loop fastener, and friction-fit connectors separate from the electrical connector components, among others. As described below in more detail, each hub connector and electronic modules may be designed and configured to connect-together only two adjacent electronic modules, while in some embodiments a hub connector and electronic modules may be designed and configure to connect-together more than two electronic modules.

As mentioned, connector units of the present disclosure can be used to operatively connect-together abutting/confronting electronic modules and/or to operatively connect such modules together and/or to control/power electronics using any suitable communications/power transmission modes. Examples of communications modes include wired modes, such as analog and digital (e.g., serial or parallel) modes, and wireless modes, such as optical, radio-frequency (RF), and microwave modes. Examples of power transmission modes include wired and wireless modes, with an example of the latter being magnetic induction power transmission. Depending upon the mode(s) involved, each connector unit will include for each mode one or more "interface points" that interface with corresponding respective operationally matched interface points on the electronic modules. Examples of operationally matched interface points include electrical contacts for wired modes, optical emitters and corresponding optical detectors for optical modes, RF transmitters and receivers for RF modes, microwave transmitters and receivers for microwave modes, and electromagnets and induction coils for magnetic induction modes, among others. Those skilled in the art will readily understand how to implement operationally matched interface points on connector units and corresponding electronic modules for any chosen communications and/or power transmission mode.

In some embodiments and relative to the operation of the electronic modules at issue, each connector unit may function as a passive pass-through device, passing control, data, and/or power signals from one electronic module to another electronic module uni-directionally or bi-directionally depending upon a particular design. In some embodiments, each connector unit may function as an active device, for example, via onboard electronics designed and configured to provide the desired functionality(ies). Examples of active functionalities that a connector unit of the present disclosure may provide include, but are not limited to, signal processing (e.g., conditioning, conversion, amplification, etc.), signal routing, power conversion (e.g., stepping voltage/current) and power distribution, communications with offboard controllers, communications with other connector units, and any combination thereof. In some embodiments of active connector units, all connector units may have the same functionality, whereas in other embodiments one or some, but fewer than all, connector units may have enhanced functionality relative to other connector units. For example, one or more enhanced connector units may act as a master or otherwise functionally controlling connector unit, whereas the non-enhanced connector units may act as slaves or otherwise functionally controlled connector unit.

As noted above, in addition to operatively connecting together abutting electronic modules, the connector units and corresponding respective electronic modules may be designed and configured to assist in aligning the abutting electronic modules relative to one another. This can be useful, for example, when the electronic modules are mounted to a support structure in a way that allows the modules to be easily moved relative to the support structure, such as when the modules are magnetically engaged with the support structure. The alignment at issue between abutting electronic modules may be "edge" alignment that can be changed by sliding one abutting peripheral edge relative to the other abutting edges, "face" alignment that can be changed by moving the planes of the faces of the electronic modules at the abutting peripheral edges closer together or farther apart from one another, gap setting that controls the spacing, or gap, if any, between confronting electronic modules, or any combination thereof. When two identical square electronic modules are mounted to a planar support structure, perfect edge alignment may occur when the peripheral edges of the electronic modules perpendicular to the abutting peripheral edges on either side of the abutment are flush with one another, and perfect face alignment may occur when the faces of the electronic module are flush with one another along the abutting peripheral edges.

In the context of biscuit-type connector units, alignment functionality of a connector biscuit of the present disclosure may be effected by shaping and sizing the interiors of the recessed receptacles and the corresponding portions of the electrical connector biscuit received therein to have a snug conformal fit in either or both of the requisite directions to provide the corresponding face and/or edge alignment functionality. A detailed example of providing such shaping and sizing is illustrated in the accompanying drawings and described below. The receptacle-engaging portions of a connector biscuit of the present disclosure and corresponding recessed receptacles may be provided with tapered/angled surfaces to assist a user in inserting the connector biscuit into the receptacle and effecting the alignment functionality.

In the context of hub-connector-type connector units, alignment functionality of a hub connector of the present disclosure may be effected by the locations of the structures that hold the electronic modules firmly to the hub connectors, such as mating electrical connector components or independent holding means, or a combination of both, if both are provided and are so configured.

In some embodiments, each connector unit and corresponding electronic modules are designed and configured so that, when the connector unit is fully engaged with the corresponding electronic modules, the connector unit is completely hidden from view by the corresponding peripheral edges of the electronic modules being butted tightly against one another. However, in other embodiments the depths (along the biscuit insertion axes) and/or configurations of the electronic modules, such as the length (along the biscuit insertion axis) and/or configuration of connector biscuit in a biscuit-based system or the locations of the complementary holding structures in a hub-connector based system, can be precisely selected to maintain any desired gap between confronting peripheral edges of the discrete electronic modules. For example, if a particular application requires a consistent 5 mm gap between all immediately adjacent discrete electronic modules, then the recessed receptacles and the connector biscuit can be sized and/or shaped to provide that gap or the complementary holding structures can be located and spaced to provide that gap.

In this connection, it is noted that if relatively large spacing between adjacent electronic modules is desired, the system can be provided with connection extenders that allow users to join together two connector units to provide an extension assembly having a length that is greater than the length of a single connector unit. Each such connection extender may have its own interface point(s) (e.g., electrical contacts, optical interface, RF interface, microwave interface, magnetic interface, etc., and any combination thereof) that interface with corresponding interface point(s) on the two connector units being joined by the connection extender. These interface points and any corresponding interconnecting conductor(s) would simply act as one or more pass-throughs for the signal(s) flowing through the units from/to the discrete electronic modules being connected together by the extension assembly. In some embodiments in which connector units are biscuit-type connector units, the connection extender may have two recessed receptacles on opposing ends for respectively receiving the two connector biscuits. In the context of the exemplary recessed receptacles of the accompanying drawings, a corresponding connection extender might look like a double wishbone when viewed from the backside of the connection extender.

Depending on the number of signals that a connector unit of the present disclosure needs to carry from one discrete electronic module to another and/or the nature of the communications interface (e.g., electrical, optical, RF, microwave, magnetic, etc.), the connector unit may include one or more interface points on each of the end portions that engage a corresponding interface point on one of the electronic modules. In some embodiments in which the interface points are electrical contacts, each electrical contact is designed and configured to contactingly engage a corresponding electrical contact, for example, in of one of the recessed receptacles of a biscuit-based system or in one of the electrical connector components of a hub-connector-based system. The electrical contacts on the connector unit may be of any type suitable for effecting positive contact with the corresponding electrical contacts of the corresponding interface points on the electronic modules. For example, if the electrical contacts of the electronic modules are of the planar type, the electrical contacts on the electrical connector unit may be of the biased type, such as a cantilevered spring type, a biased pin type ("pogo pin"), an arched spring type ("leaf spring"), among others known in the art. Those skilled in the art will readily appreciate that the contact types can be reversed, with the planar contacts being on the electrical connector unit and the biased contacts being part of the interface point of an electronic module.

When planar-type electrical contacts are used for interface points, they can be in any suitable location and orientation. For example, the planar electrical contact may be either parallel or perpendicular to the electronic module engagement axis along which an electronic module is engaged with a connector unit. For the former, the engagement of the corresponding biased-type contacts includes sliding engagement, and, for the latter, the engagement of the corresponding biased-type contacts includes compressive engagement. In some embodiments, it can be desirable to orient the planar electrical contacts parallel, or largely parallel, to the biscuit insertion axis to avoid the biasing of biased contacts pushing the discrete electronic modules away from one another, as could potentially occur with planar contacts oriented perpendicularly to the insertion axis. As those skilled in the art will appreciate, orienting planar contact parallel to the electronic module engagement axis and using bias-type contacts can result in the biasing of bias-type contacts holding the connector biscuit in place. Other types of electrical contacts, such as pins and blades, can additionally or alternatively be used. It is noted that electrical contacts can be provided in sufficient number such that there are one or more contacts for the same connection. With extra/redundant electrical contacts, current can be higher and/or data frequency can be increased.

In some embodiments, some or all functional interface points on one end of a connector biscuit or at one electrical connector component of a hub connector of the present disclosure may be in operative communication with at least one interface point on the other end of the connector biscuit or another electrical connector component of the hub connector. Operative communication may include direct communication, for example, via electrical or optical conductors, and/or indirect communication, such as when the connector unit contains electronic circuitry for modifying one or more signals from one electronic module before providing the modified signal(s) to another electronic module and/or for generating one or more new signals from one or more signals from one module for providing to another module, among others. In some embodiments, some or all functional interface points on a connector unit may not be of the pass-through type, with their signal(s) not originating from a connected electronic module but from one or more signals received wirelessly from a remote source. Examples of signals that a connector unit of the present disclosure may carry from one electronic module to another or provide to an electronic module in a non-pass-through manner include power signals, control signals, clock signals, and data signals, among others, and any combination thereof.

In embodiments in which the electronic modules are mounted on a ferromagnetic substrate by magnetic attraction, each connector unit may include one or more magnets for attracting the connector unit to a non-magnetized substrate or, alternatively and when the ferromagnetic support material is magnetized, may include non-magnetized ferromagnetic material so that the connector unit is attracted to the substrate.

In some embodiments in which the modular electronic system includes discrete display tiles forming a multi-tile composite display, or mosaic, and the multi-tile display is used in a finished room of a building, such as on a wall or ceiling, the modular electronic system may include one or more power sources and one or more other components, such as display controller(s) and/or data source(s), operatively coupled to one or more of the discrete display tiles of the multi-tile display. For example, each of these components may be located within a cavity of finishing or decorative trim, such as a cavity of a decorative baseboard, a cavity of chair rail, or a cavity of decorative crown moulding, or any combination thereof, among others. In some embodiments, the trim may be composed of multiple components. For example, the electronics-containing trim may include a base that attaches to the wall, floor, and/or ceiling at issue, a heat sink that removably attaches to the base and that at least partially forms the electronics-containing cavity(ies), and a cover that removably attaches to the base and/or heat sink to provide the assembly with a finished look. Such a cover may be painted or otherwise finished as desired, for example, to match existing conventional trim. In some embodiments, the base may be eliminated and/or the cover may be integrated with or permanently attached to the heat sink. In some embodiments, one or more of discrete display tiles can be operatively connected to the electronics in such a trim assembly via one or more connector biscuits of the present disclosure. In other embodiments, electrical connections can be made in any other suitable manner. In yet other embodiments, other forms of communications, such as RF, microwave, or optical, may be used, thereby eliminating physical connections between the discrete display tiles and the corresponding electronics.

As noted above, the accompanying drawings illustrate exemplary embodiments of electronic modules, connector units (e.g., biscuits and hub connectors), electronic module assemblies and sub-assemblies, and electronics-concealing finish trim. These examples should not be considered limiting in any way, as they are provided primarily to present visual examples of at least some of the features and aspects described above. In addition, where a feature or aspect of any of the embodiments described below is not particularly addressed, the general description, including variations and alternatives, of the description of the corresponding feature or aspect above shall apply to that feature or aspect to the extent that it is not contrary to the explicit description provided below.

Exemplary Embodiments

Examples Using Biscuit-Type Connector Units

Figure 1B:
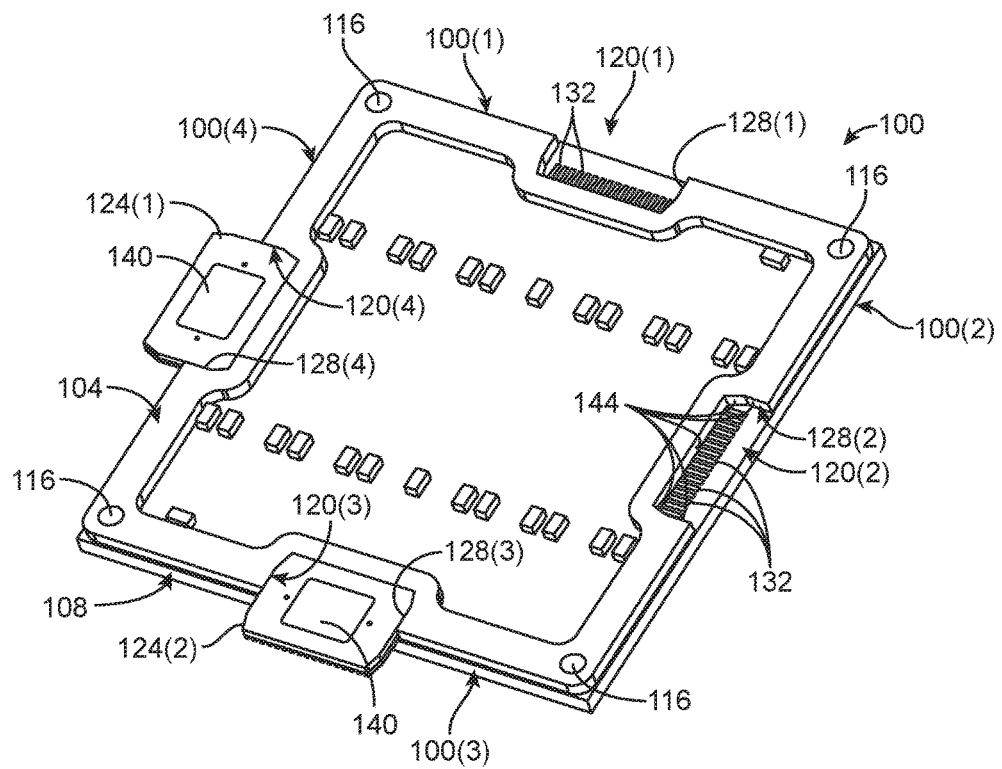
FIG. 1B is an enlarged isometric view of the display tile of FIG. 1A, showing the rear face of the tile and the two connector biscuits engaged with the two recessed receptacles.

Referring now to the drawings, FIGS. 1A and 1B illustrate an exemplary discrete electronic module, here a display tile 100, made in accordance with aspects of the present invention. In this example, display tile 100 includes a backing portion 104 and an active portion 108. Backing portion 104 in this example is made of a material having a relatively high thermal conductivity to allow it to function as a heat sink for active portion 108. Active portion 108 in this example comprises a flat-panel graphical display device that makes display tile 100 an active component of a larger composite video display (not shown). Such display device may be based on any suitable display technology, such as any of the display technologies mentioned above in the General Description section. In one exemplary but non-limiting instantiation, the front face of the display tile is 150 mm×150 mm.

FIG. 1A primarily shows the front face 112 of display tile 100, which is the display face that a viewer sees when viewing the composite video display of which display tile 100 would be part of when deployed. In this example, display tile 100 is a magnetically mountable tile, and the magnetic mounting is effected by a set of permanent magnets 116 fixed to back portion 104 (FIG. 1B). As those skilled in the art will readily appreciate, any of a variety of discrete permanent magnets can be used for permanent magnets 116. Not shown in FIGS. 1A and 1B but able to be readily envisioned, is a ferromagnetic support structure, such as a non-magnetized ferromagnetic metal sheet or metal lattice, to which permanent magnets 116 are attracted when the display tile is deployed in a composite video display.

FIG. 1B shows that in this example display tile 100 has four recessed receptacles 120(1) to 120(4), one centered on each of the four peripheral edges 100(1) to 100(4) of the tile, two of which shown as being engaged by a pair of identical connector biscuits 124(1) and 124(2), which are the same as or similar to connector biscuit 300 depicted in FIGS. 3A and 3B and described below. In the embodiment shown in FIG. 1B, each recessed receptacle 120(1) to 120(4) is essentially formed by a recess 128(1) to 128(4) in display tile 100, which can be formed by a notch in backing portion 104 along a corresponding peripheral edge of the display tile if the depth of the recess is equal to or greater than the thickness of the backing portion.

As seen in FIG. 1B, in this example, each recessed receptacle 120(1) to 120(4) includes 16 planar electrical contacts 132 (only a few labeled to avoid clutter and only visible for receptacles 120(1) and 120(2)) on active portion 108 of display tile 100, and as seen in FIG. 1A, each connector biscuit 124(1) and 124(2) includes 16 corresponding electrical contacts 136 (only a few labeled to avoid clutter), here, of the leaf-spring type, that engage the 16 planar contacts when the connector biscuit is fully engaged with the corresponding recessed receptacle. Those skilled in the art will readily appreciate that any other suitable number of electrical contacts may be provided to active portion 108 and connector biscuits 124(1) and 124(2) in accordance with a particular design. It is noted that electrical contacts 132 need not be on active portion 108. For example, if the depth of each recessed receptacle 120(1) to 120(4) is less than the thickness of backing portion 104, then electrical contacts 132 may be provided on the backing portion. As another example, if display tile 100 were to have a construction different from the construction illustrated, such as by including another layer or other structure, electrical contacts 132 could be provided on such other layer or other structure. Planar contacts 132 and the corresponding connector biscuits, such as connector biscuits 124(1) and 124(2), allow display tile 100 to communicate with another display tile (not shown, but see FIGS. 2A and 2B, or other component (not shown) of an overall composite display system, such as a video controller, data source, and/or power source, among others. In the illustrated embodiment and as seen in FIG. 1B, each connector biscuit 124(1) and 124(2) includes a permanent magnet 140 for magnetically attracting that biscuit to a non-magnetized ferromagnetic support structure, such as the metal sheet or metal lattice mentioned above.

Figure 2A:
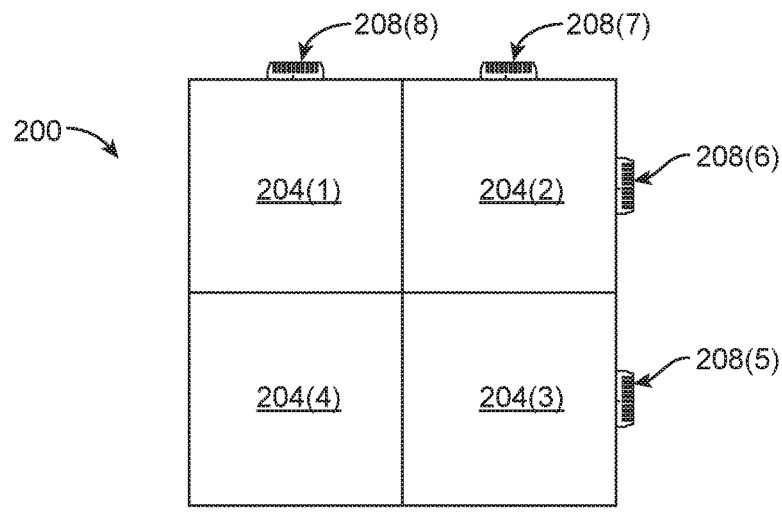
FIG. 2A is a front elevational view of an exemplary assembly of four display tiles operatively connected together via connector biscuits.
Figure 2B:
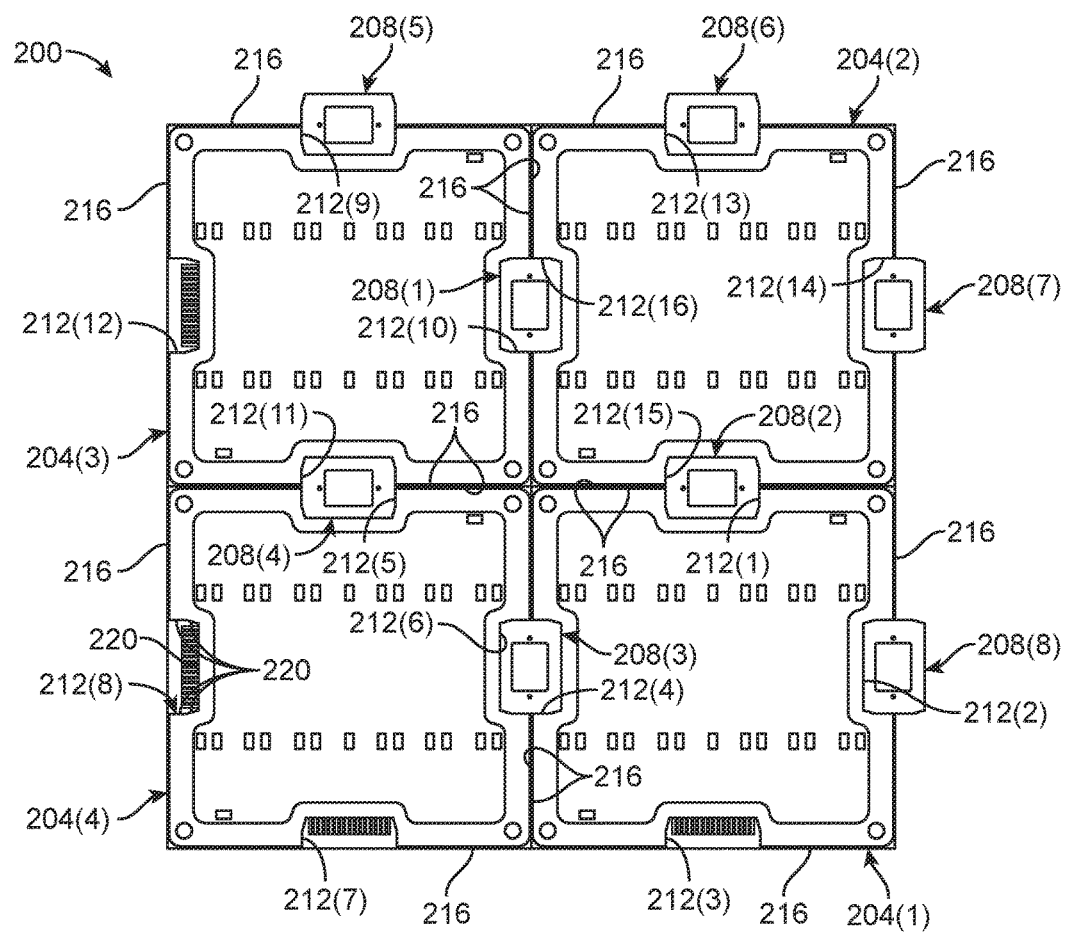
FIG. 2B is an enlarged rear-elevational view of the assembly of FIG. 2A, showing the four display tiles operatively connected together via four connector biscuits.

FIGS. 2A and 2B illustrate a display mosaic, here a portion 200 of a larger composite display, composed of four display tiles 204(1) to 204(4), each physically identical to display tile 100 of FIGS. 1A and 1B, electrically connected together via four connector biscuits 208(1) to 208(4) that are each identical to connector biscuits 124(1) and 124(2) shown in FIGS. 1A and 1B. In the example of FIGS. 2A and 2B, the sizes and shapes of connector biscuits 208(1) to 208(4) and recessed receptacles 212(1) to 212(16) are carefully selected and formed to create very tight fits that minimize the amount of play between abutting display tiles, such as tiles 204(1) to 204(4), particularly in a direction parallel to the abutting peripheral edges 216 (only a few labeled to avoid clutter). This allows the display tiles, such as tiles 204(1) to 204(4) to be precisely aligned with one another, which can be critical for providing a high-quality composite display, where even small offsets can visually detract from the images displayed on the display. FIGS. 2A and 2B also show four additional connector biscuits 208(5) to 208(8) engaged with three of display tiles, here, display tiles 204(1), 204(2), and 204(4), each waiting to be operatively (here, electrically) connected to another display tile (not shown) or other component (not shown) of an overall video display system, such as a video controller, data source, and/or power source, among others. It is noted that while each display tile 204(1) to 204(4) is illustrated as having a single recessed receptacle 212(1) to 212(16) on each peripheral edge 216, as noted above, each peripheral edge may be provided with two or more recessed receptacles as needed to suit a particular design.

Figure 3A:
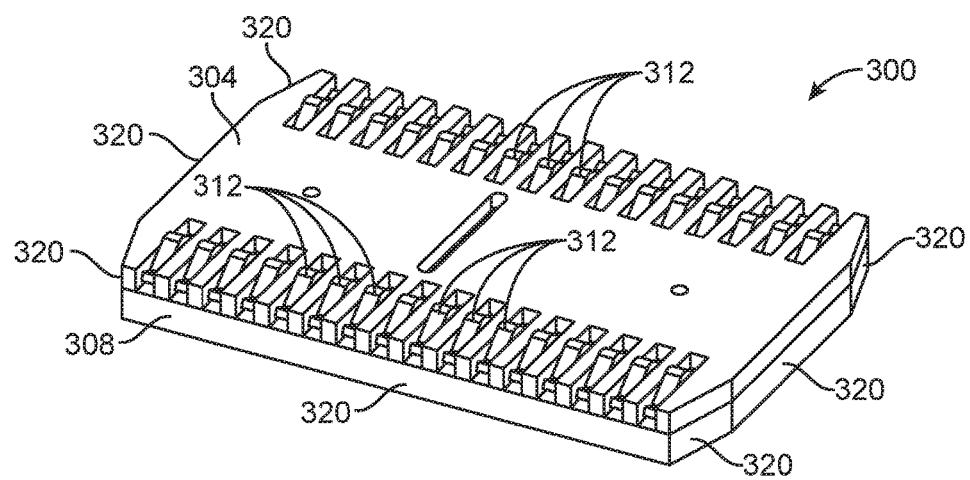
FIG. 3A is an isometric view of a connector biscuit that can be used as any of the connector biscuits of FIGS. 1A to 2B, showing its front face.
Figure 3B:
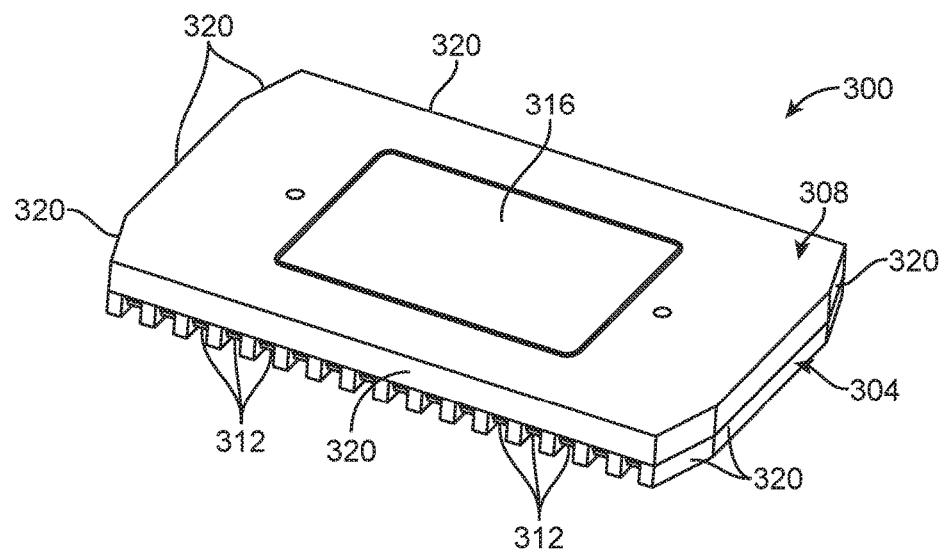
FIG. 3B is an isometric view of the connector biscuit of FIG. 3A, showing its rear face.

FIGS. 3A and 3B illustrate features of a connector biscuit 300 that is the same as or similar to each of connector biscuits 124(1) and 124(2) of FIGS. 1A and 1B and connector biscuits 208(1) to 208(8) of FIGS. 2A and 2B. As seen in FIG. 3A, in this embodiment connector biscuit 300 includes front and back housing components 304 and 308 secured together in a manner that sandwiches the electrical conductor(s) that provide the 16 leaf-spring-type electrical contacts 312 (only a few labeled to avoid clutter) on each end of the biscuit. As noted above, the overall size, shape, and configuration of connector biscuit 300 may be selected and formed to snugly engage corresponding recessed receptacles, such as recessed receptacles 120(1) to 120(4) of FIGS. 1A and 1B and recessed receptacles 212(1) to 212(16) of FIGS. 2A and 2B, on the electronic modules at issue and, if desired, any additional components of an overall mosaicked system of such modules. In some embodiments, each pair of corresponding electrical contacts 312 on opposing ends of connector biscuit 300 may be in electrical communication with one another but electrically insulated from each other pair of electrical contacts to provide 16 separate signal paths. In other embodiments, some or all of the 16 electrical contacts 312 on one end of connector biscuit 300 may be electrically connected in one or more groups to the 16 electrical contacts on the other end of the biscuit, depending on the design requirements of the overall mosaicked system. In other embodiments, examples of which are described below in connection with FIG. 8, various ones or all of the interface points (e.g., electrical contacts 312) may be connected to one or more electronic components located onboard the connector biscuit, such as, but not limited to, microprocessor(s), signal processor(s), wireless communications device(s), among others, and any combination thereof. FIG. 3B illustrates this embodiment of connector biscuit 300 as including a magnet 316 secured to back housing component 308 that confronts a support structure (not shown) when the connector biscuit is deployed for use.

In the embodiment shown, connector biscuit 300 includes lateral surfaces, such as lateral surfaces 320, that are designed and configured to confront like surfaces within a recessed receptacle, such as like surfaces 144 and 220, of FIGS. 1B and 2B, respectively, with minimal or no gaps therebetween, so as to effect a precision fit between the connector biscuit and that electrical receptacle. In this manner and when used with abutting discrete electronic modules, such as display tiles (e.g., display tiles 100, 204(1) to 204(4), 412(1) to 412(9), 704(1) to 704(4), and 724(1) to 724(4) of FIGS. 1A, 1B, 2A, 2B, 4, and 7A-7D), full engagement of the connector biscuit 300 with the mating receptacle can ensure proper edge alignment and/or gap between the electronic modules connected together by the connector biscuit.

It is noted that while connector biscuit 300 is illustrated as having two housing components 304 and 308, in other embodiments, it may have another construction, such as a monolithically molded construction or construction having more, fewer, and/or differing types of housing construction. In other embodiments, magnet 316 may be eliminated or replaced by another type of fastening means, such as an adhesive-based fastening means, hook-and-loop-based fastening means, or snap-fit mechanical connector, among others. Furthermore, in other embodiments, electrical contacts 312 may be replaced with another type of electrical contact, such as planar contacts, socket contacts, and pin contacts, among others, and/or may be provided in any suitable number, or may be replaced by another type of interface point, such as an optical interface point, an RF interface point, a microwave interface point, or magnetic interface point, among others. In addition, the specific shape of exemplary connector biscuit 300 is merely exemplary and non-limiting, as many other shapes are possible.

Figure 4:
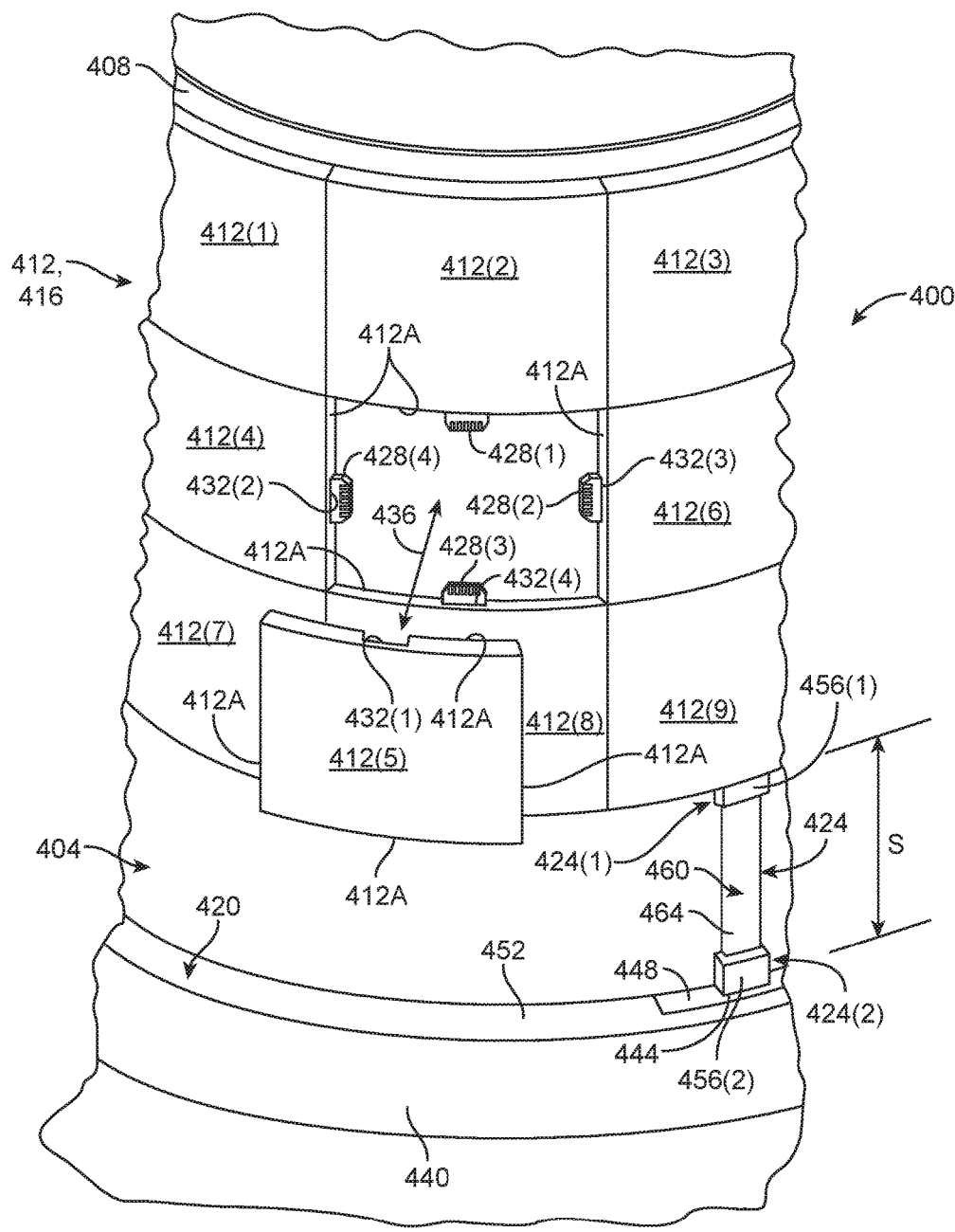
FIG. 4 is a partial isometric view of an exemplary display mosaic system of the present invention, showing one of the display tiles disengaged from the mosaic to illustrate the ease of installing and removing an individual tile to and from the mosaic.

FIG. 4 illustrates a display mosaic system 400 that illustrates some important features and aspects of the present invention. In this example, display mosaic system 400 is applied to curved structure 404, such as a curved wall, a cylindrical building column, or freestanding curved pylon, among others. Display mosaic system 400 includes: 1) a curved, plate-type support structure 408; 2) a plurality of identical curved display tiles 412 (here, nine display tiles 412(1) to 412(9) are at least partially visible) magnetically attached to the support structure and electrically connected to one another to form a display mosaic 416; 3) a baseboard-style power/control system 420; and 4) a biscuit extender 424 electrically connecting the power/control system to the display mosaic. As used herein and in the appended claims, the term "power/control system" means power and/or control system to indicate that its function can range from providing only power to display mosaic 416, for example, if display tiles 412 are only simple light sources, to providing both power and one or more types of control signals to the display tiles. Examples of control signals include any sort of video-display control signals as well as simple color-control signals, such as when one or more of display tiles 412 is configured to controllably emit light of differing colors.

In the embodiment shown, support structure 408 is made of any one or more materials suitable for the manner in which display tiles 412 attach to the support structure. For example, if display tiles 412 attach to support structure 408 by magnetic attraction, the support structure may be a sheet of steel or other non-magnetized ferromagnetic material if the display tiles have magnets. If display tiles 412 attach to support structure 408 by other means, such as adhesive, hook-and-loop fasteners, or other mechanical fasteners, the support structure may be configured accordingly.

Each display tile 412 can be any type of display tile, depending on the nature of display mosaic 416. For example, display mosaic 416 may be a composite display acting as a single large display or as multiple smaller displays, with each smaller display composed of one or more of display tiles 412 acting as a group. As another example, display mosaic 416 may be an illumination mosaic acting as a single large illumination mosaic or as multiple smaller illumination mosaics, with each smaller mosaic composed of one or more of display tiles 412 acting as a group. In the spirit of the connector biscuits described above, such as connector biscuits 124(1), 124(2), 208(1) to 208(8), and 300 of FIGS. 1A to 3B and the connector biscuits described in the General Description section above, display tiles 412 are operatively connected together via connector biscuits 428, four of which are visible in FIG. 4 at elements 428(1) to 428(4). Each connector biscuit 428 may be generally the same as all others of the connector biscuits, with the exception that for this curved application, the biscuits may be provided in sets of differing curvatures to account for the curvature of curved structure 404 and the two orientations of the biscuits in the mosaic. For example, each of connector biscuits 428(1) and 428(3) and like situation biscuits not seen may have a curvature along its longitudinal axis, and each of connector biscuits 428(2) and 428(4) and like biscuits not seen may have a curvature perpendicular to its longitudinal axis. Other features and aspects of connector biscuits 428 may be the same as or similar to other features and aspects of other connector biscuits described herein.

Like exemplary display tiles 100 and 204(1) to 204(4) of FIGS. 1A to 2B, each of display tiles 412 in this example is rectangular in shape, but curved, and has four recessed receptacles 432, four of which are visible at elements 432(1) to 432(4), one on each of peripheral edge 412A (only a few labeled to avoid clutter) of that tile. Each recessed receptacle 432 may be curved in the appropriate direction to match the curvature of structure 404 and corresponding respective ones of connector biscuits 428. Each recessed receptacle 432 may be the same as or similar to any of recessed receptacles 120(1) to 120(4) and 212(1) to 212(16) of FIGS. 1A to 2B and described above in the General Description section. A benefit of the configurations of recessed receptacles 432 and corresponding connector biscuits 428 is that individual display tiles 412 can be removed and installed easily, for example using a suction-cup tool (not shown), without disturbing immediately adjacent display tiles. This is so because the recessed configuration of recessed receptacles 432 allows each display tile 412 to be engaged with its corresponding connector biscuits 428 by moving that display tile in a direction generally normal (accounting for any curvature of the support structure, here, support structure 408) to the face of the support structure, as illustrated by directional arrows 436. As such, for example, a failed or damaged one of display tiles 412 can be easily removed from completed display mosaic 416 and replaced and the display mosaic can be constructed or dismantled without regard to any particular order of installing or removing the display tiles.

Baseboard-style power/control system 420 includes a housing 440 that may be designed and configured to mimic the look and/or function of a conventional baseboard of a finished habitable space. It is noted that in other embodiments, housing may be designed and configured to mimic the look and/or function of other conventional trim, such as chair rail and crown moulding, among others. Housing 440 may house any or all of the power/control devices (not shown), for example, power supply(ies), video controller(s), and/or color controllers, among others, needed to make display mosaic 416 functional, depending on its nature. Power/control system 420 may include one or more recessed receptacles 444 designed and configured to receive a corresponding connector biscuit, here one of connector biscuits 428 having suitable curvature. In some embodiments, each recessed receptacle 444 provided may be movable along the length of housing 440, for example, within a predetermined range of movement, to allow an installer to align a desired one of recessed receptacle(s) 444 with a corresponding recessed receptacle 432 on one of display tiles to which power/control system 420 is to be connected. For example, this could be achieved by using flexible electrical conduits (not shown) within housing 440 to connect each recessed receptacle 444 to the electronics inside the housing and providing such conduits with sufficient length and room for movement. In addition, each such movable recessed receptacle 444 may be coupled to laterally movable housing closure 448 on either side of the electrical receptacle that over- or under-laps fixed housing closure 452 to close housing 440.

Biscuit extender 424 is used in this example to carry power/signals across the space, S, between display mosaic 416 and power/control system 420. That said, it is noted that in other embodiments, display mosaic 416 can be located so as to abut housing 440 of power/control system 420, in which case only one of connector biscuits 428 needs to be used. However, with space S present, two such connector biscuits 428 are used in conjunction with biscuit extender 424. Biscuit extender 424 has first and second ends 424(1) and 424(2) each having a corresponding recessed receptacle (hidden) that is identical to like ones of recessed receptacles 432 so that the same connector biscuits 428 can be used. Each electrical receptacle 432 can be contained in a suitable end housing 456(1) and 456(2) secured to an electrically conducting ribbon 460, which in this example contains 16 electrical conductors (not visible) corresponding to 16 electrical contacts (not shown) in each recessed receptacle. When support structure 408 comprises a non-magnetized ferromagnetic material, each end housing 456(1) and 456(2) may include one or more magnets (not shown) that attach that end housing to the support structure. In other embodiments, other attachment means, such as any of the attachment means described above, can be used to attach each end housing 456(1) and 456(2) to support structure 408. To keep conducting ribbon 460 flat against support structure 408 when the support structure includes a non-magnetized ferromagnetic material, the conducting ribbon may include a flat sheet magnet (not shown) or other type of magnet. In other embodiments, another type of attaching means can be used, such as adhesive, hook-and-loop fasteners, or other type of fastener. One or both of end housings 456(1) and 456(2) may be of a type that allows a user to cut conducting ribbon 460 to the needed length and then secure the end housing to conducting ribbon in a manner that electrically self-connects the electrical contacts (not shown) in the corresponding recessed receptacle to the electrical conductors within the conducting ribbon, such as using 16 contact blades (not shown) that pierce an insulation layer 464 of the conducting ribbon to make electrical contact with the electrical conductors.

Figure 5:
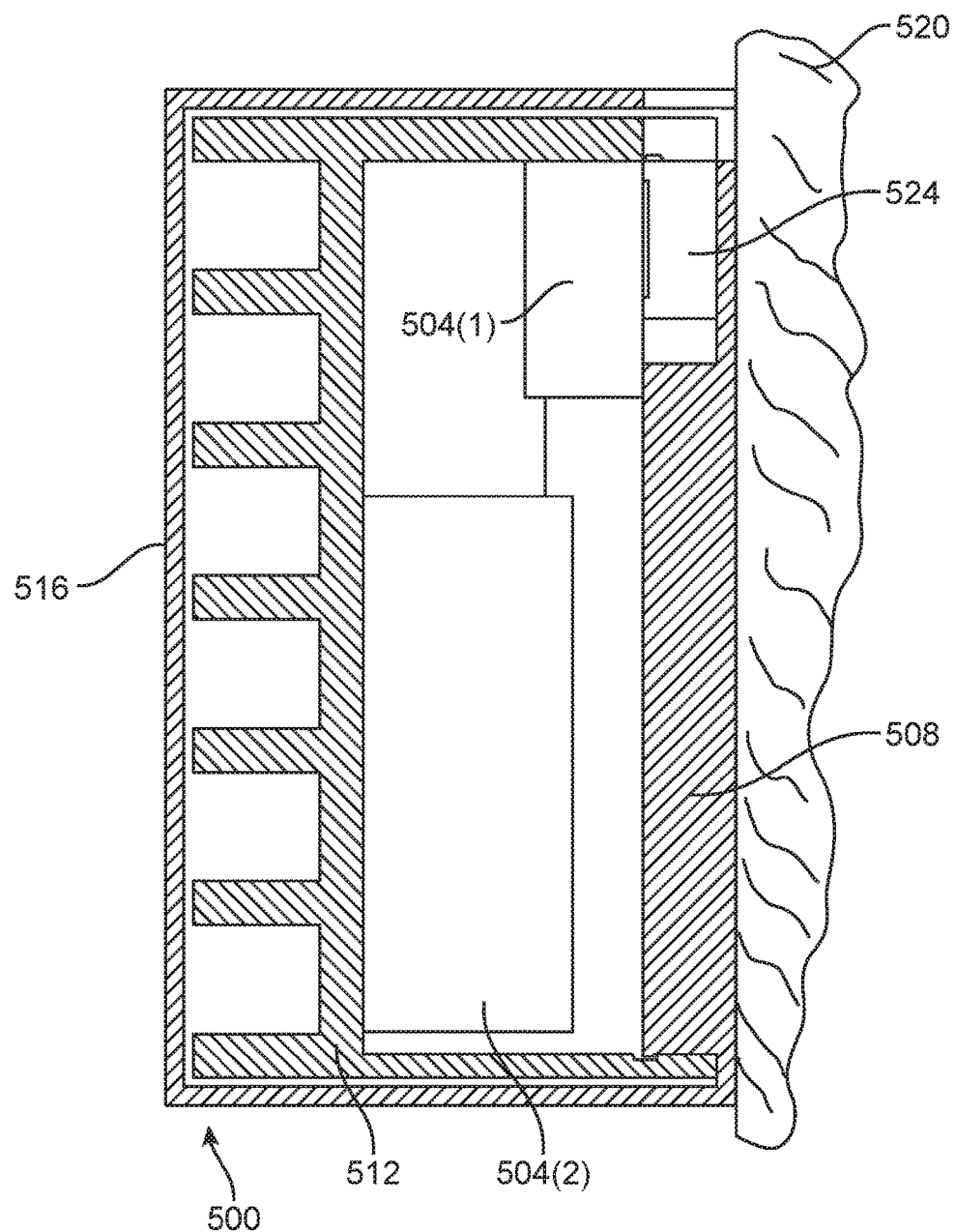
FIG. 5 is a transverse cross-sectional view/partial schematic view of an electronics-concealing finish trim assembly made in accordance with the present invention engaged with a wall.

FIG. 5 illustrates an exemplary electronics-concealing finish trim assembly 500 that can be used with display tiles and/or other discrete electronic modules of the present disclosure, such as any of display tiles 100, 204(1) to 204(4), and 412(1) to 412(9) of FIGS. 1A, 1B, 2A, 2B, and 4 (such as for baseboard-style power/control system 420 of FIG. 4), and the display tiles described in the General Description section above. A finish trim assembly of the present disclosure, such as the finish trim assembly 500 of FIG. 5, may be used to conceal any or all electronics components 504, such as electronic components 504(1) and 504(2), not located onboard the discrete electronic modules (not shown). Examples of such electronic components include, but are not limited to, power sources, display drivers, data sources, color controllers, etc., and any combination thereof. Fundamentally, there are no constraints on the type of electronic components that can be concealed within finish trim assembly 500. As seen in FIG. 5, finish trim assembly 500 may include a base 508, a heat sink 512, and a cover 516. Base 508 may be securable to a wall or other structure 520, with heat sink 512 being removably secured to base 508 and cover 516 being removably secured to the heat sink and/or base. In other embodiments, heat sink 512 may be thermally engaged with base 508 or integrated with the base to sink heat through support structure 520. In this example, base 508 includes one or more recessed receptacles 524 designed and configured to receive a corresponding connector biscuit (not shown), which may be the same as or similar to any of the connector biscuits shown and/or described herein. This allows one or more of the discrete electronic modules to be connected to finish trim assembly 500 and electronic component(s) 504 concealed therein without needing any different connectors. It is noted that finish trim assembly 500 shown in FIG. 5 is merely exemplary and that similar finish trim assemblies may be configured differently, such as without a base and/or with the heat sink rotated 180° so that the cover covers the cavity, among others. In addition, each recessed receptacle 524, if provided, may be provided in a different component, such as the heat sink. Those skilled in the art will readily understand the variety of ways that a finish trim assembly of the present disclosure can be executed.

In other embodiments, any or all electronics that may be concealed in a finish trim assembly, such as finish trim assembly 500 of FIG. 5, may be provided in another manner. For example, such electronics may be provided in one or more electronics modules that mount to the same support structure that supports the corresponding display tiles in abutting fashion to any one or more of the display tiles. In such embodiments, the electronics module(s) may each have a form factor that is the same or similar to the form factor of the individual display tiles, or, alternatively, the form factor may be different, such as a form factor that makes the electronics module(s) appear to form a perimeter frame member, for example, any one or more of a side frame member, bottom frame member, and a top frame member, for the corresponding mosaicked display. By virtue of the abutment of the electronics module(s) with one or more display tiles, any one or all of the electronics modules may operationally connect to the display tile(s) via one or more connector biscuits in the same manner that individual display tiles are operationally connected to one another.

Figure 6:
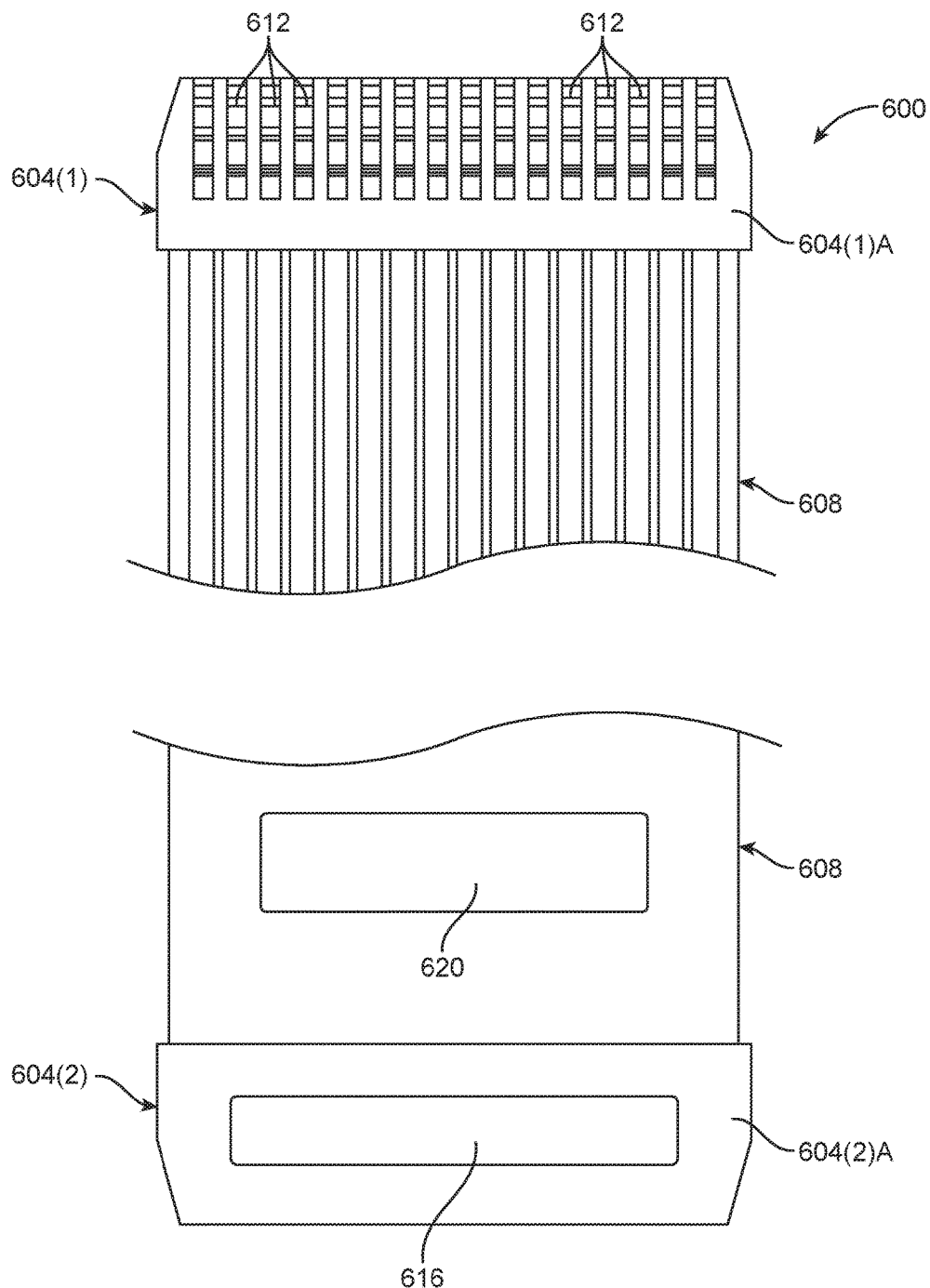
FIG. 6 is a view of an exemplary flexible electrical connector assembly of the present invention, showing one end of the connector flipped over to illustrate the front and back sides of the connector ends.

FIG. 6 illustrates a flexible electrical connector 600 that can be used, for example, in place of biscuit extender 424 of FIG. 4. Referring to FIG. 6, flexible electrical connector 600 includes identical first and second end connectors 604(1) and 604(2) electrically connected together via a conductive ribbon 608. In this example, each end connector 604(1) and 604(2) is identical to one half of connector biscuit 300 of FIGS. 3A and 3B in terms of number and style of electrical contacts 612 (only a few labeled to avoid clutter) or other interface point(s). With 16 electrical contacts 612 electrically insulated from one another, conductive ribbon 608 includes a corresponding set of 16 electrical conductors (not shown) electrically insulated from one another. Each end connector 604(1) and 604(2) may be considered to have a housing 604(1)A and 604(2)A that holds electrical contacts in place and contains the ends (not seen) of conductive ribbon 608 and the electrical connections therebetween. In a manner similar to biscuit extender 424 of FIG. 4, at least one of end connectors 604(1) and 604(2) may be of the sort that allows a user to cut conductive ribbon 608 to any desired length before securing the end connector to the conductive ribbon in a manner that completes the electrical connection between the electrical conductors inside the ribbon to electrical contacts 612. In the embodiment shown, which is for a mosaic system having a non-magnetized ferromagnetic support structure, each end connector 604(1) and 604(2) includes a permanent magnet 616 for holding flexible electrical connector 600 to the support structure. Conductive ribbon 608 may optionally include one or more permanent magnets 620 to assist holding the conductive ribbon flat to the support structure. As noted above, in other embodiments, permanent magnets 616 and 620 may be replaced by other fastening means, such as one part of hook-and-loop fasteners, adhesive patches, adhesive tape, mechanical fasteners, etc.

FIGS. 7A to 7D illustrate four different mosaicked displays 700A, 700B, 700C, and 700D, each made with either one or two types of display tiles, an oblong rectangular type and a stair type. Although not seen, abutting ones of the display tiles are electrically connected to, and may be at least partially aligned with, one another using connector biscuits, such as any of the connector biscuits 124(1), 124(2), 208(1) to 208(8), 300, and 428(1) to 428(4) shown in FIGS. 1A to 4 and described above in the General Description section. In each of exemplary mosaicked displays 700A, 700B, 700C, and 700D, the display tiles may be of a magnetic type and may be the same as or similar to the display tiles of FIGS. 1A to 2B, and the connector biscuits may be of a magnetic type the same as or similar to the connector biscuit of FIGS. 3A and 3B.

Figure 7A:
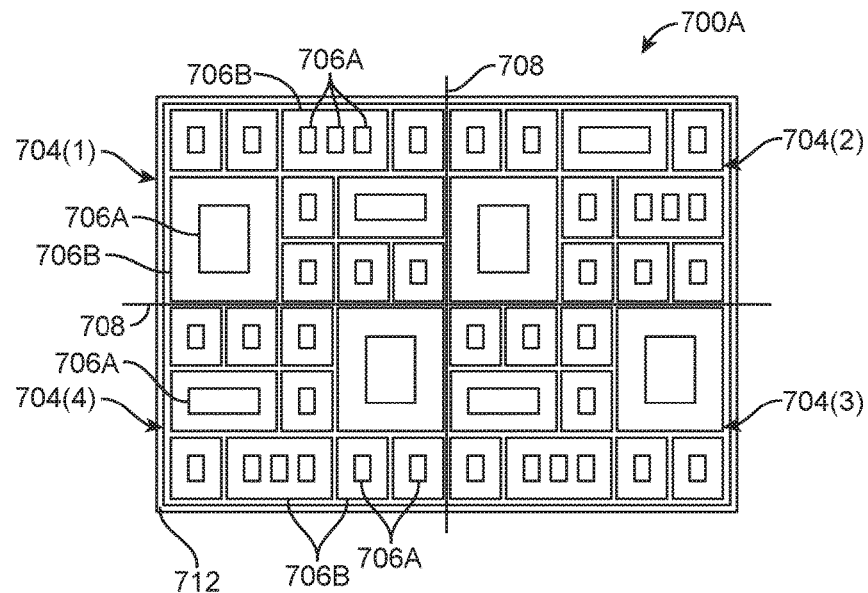
FIG. 7A is a partial diagrammatic/partial elevational view of four identical discrete rectangular electronic modules arranged on a wall and electrically interconnected together in a side-by-side and stacked configuration.

FIG. 7A shows four like oblong rectangular display tiles 704(1) to 704(4) arranged two-over-two, with the long sides horizontal, to provide mosaicked display 700A. The rectangular boxes, such as boxes 706A and 706B (only a few labeled to avoid clutter), in each display tile 704(1) to 704(4) represent electronic components, such as display drivers, power electronics, and communications systems, among others. Those skilled in the art will readily appreciate that these components typically lie behind the display face (not shown) of each of display tiles 704(1) to 704(4) and are shown to illustrate potential electronic complexity of the display tiles. Unlabeled like boxes throughout FIGS. 7A-7D illustrate like electronic components. As mentioned above, display tiles 704(1) to 704(4) are electrically connected together, and abutting/confronting edges (indicated by heavy lines 708) are aligned with one another, using connector biscuits (hidden), which may be the same or similar to any of the connector biscuits shown and/or described elsewhere in this disclosure. In this example, display tiles 704(1) to 704(4) and the interconnecting connector biscuits are attached to a support sheet 712 that may have the same shape as the outline of composite display. It is noted that support sheet 712 is shown as having a size slightly larger than the size of mosaicked display 700A for the sake of illustration. In some embodiments, the size of support sheet 712 may be the same as or smaller than the size of mosaicked display 700A for a "cleaner" look. In some embodiments, support sheet 712 may be a non-magnetized ferromagnetic sheet and display tiles 704(1) to 704(4) may be magnetically attached to the support structure, for example, in any of the manners described above. In some embodiments, the attachment may be effected by other means, such as adhesive bonding or mechanical fasteners, among others.

Figure 7B:
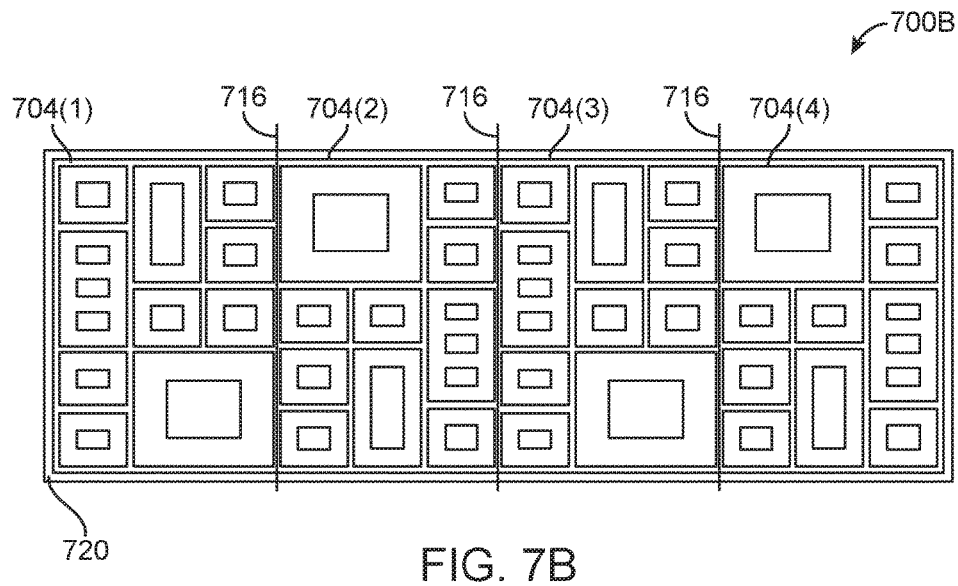
FIG. 7B is a partial diagrammatic/partial elevational view of four identical discrete rectangular electronic modules arranged on a wall and electrically interconnected together in a side-by-side configuration.

For the sake of illustration, FIG. 7B shows the same four display tiles 704(1) to 704(4) arranged side-by-side and oriented 90° relative to the orientations shown in FIG. 7A so as to provide a differently configured mosaicked display 700B. The configurations of FIGS. 7A and 7B can be readily achieved because of the presence of recessed receptacles (not seen) that are the same as or similar to recessed receptacles 120(1) to 120(4), 212(1) to 212(16), and 432 of FIGS. 1A, 1B, 2A, 2B, and 4 or other recessed receptacles described above, located symmetrically along the four peripheral edges of each of the like display tiles 704(1) to 704(4). As with mosaicked display 700A of FIG. 7A, abutting edges (indicated by heavy lines 716) of display tiles 704(1) to 704(4) in mosaicked display 700B of FIG. 7B are electrically connected to, and at least partially aligned with, one another using connector biscuits as described above. Other attributes and features of mosaicked display 700B may be the same as the corresponding attributes and features described above relative to mosaicked display 700A, and mosaicked display 700B may, for example, be magnetically attached to a like-shaped support structure 720.

Figure 7C:
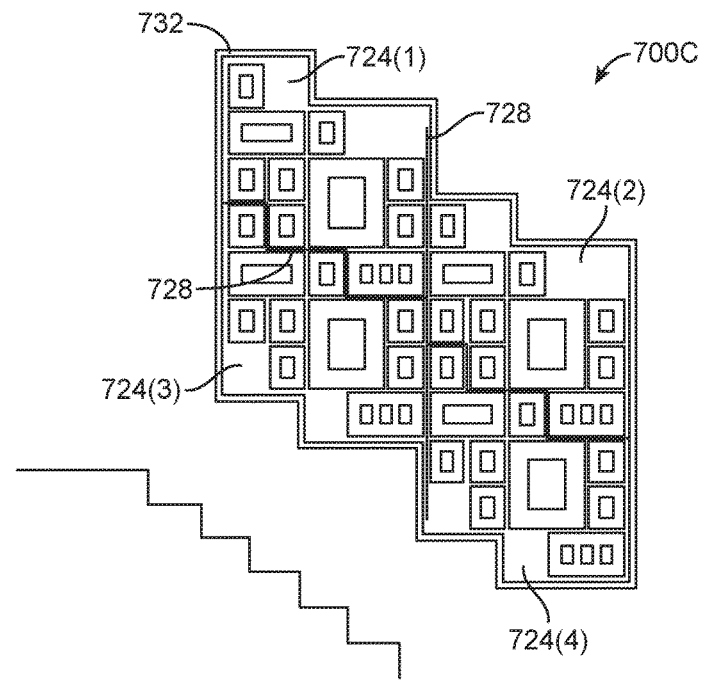
FIG. 7C is a partial diagrammatic/partial elevational view of four identical discrete stepped electronic modules arranged on a wall and electrically interconnected together in a side-by-side and stacked configuration.

FIG. 7C illustrates mosaicked display 700C as comprising four like stair-step-type display tiles 724(1) to 724(4) arranged two-over-two. Abutting edges (indicated by heavy lines 728) are electrically connected to one another via connector biscuits (hidden), such as any of the connector biscuits shown and/or described elsewhere in this disclosure. In the cases of the connection between display tiles 724(1) and 724(2) and the connection between display tiles 724(3) and 724(4), their alignment with one another is precisely controlled by the connector biscuits therebetween. In this example, display tiles 724(1) to 724(4) and the interconnecting connector biscuits may be magnetically engaged with an underlying non-magnetized ferromagnetic sheet 732 that may have the same shape as the outline of mosaicked display 700C.

Figure 7D:
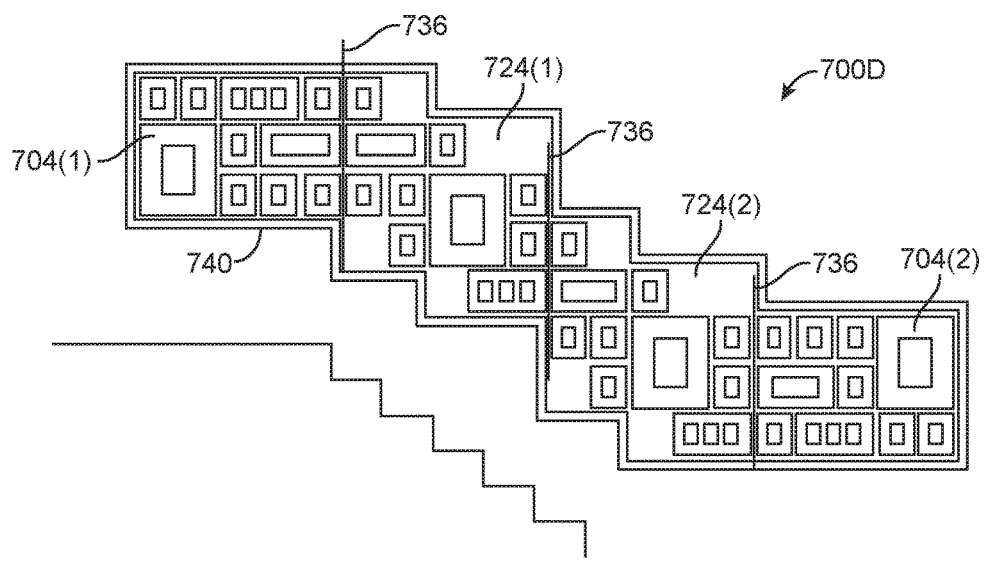
FIG. 7D is a partial diagrammatic/partial elevational view of two identical discrete stepped electronic modules and two identical discrete rectangular electronic modules arranged on a wall and electrically interconnected together in a side-by-side configuration.

FIG. 7D illustrates two rectangular display tiles 704(1) and 704(2) of FIGS. 7A and 7B and two stair-step-type display tiles 724(1) and 724(2) of FIG. 7C, arranged side-by-side to provide yet another differently configured mosaicked display 700D. Abutting edges (indicated by heavy lines 736) are electrically connected to, and at least partially aligned with, one another using connector biscuits (hidden), such as the connector biscuits described elsewhere herein. In this example, display tiles 704(1), 704(2), 724(1), and 724(2) and the interconnecting connector biscuits may be magnetically engaged with an underlying non-magnetized ferromagnetic sheet 740 that may have the same shape as the outline of mosaicked display 700D. These are but a few of the virtually endless number of arrangements that are possible using discrete electronic modules and electrical biscuit connectors of the present disclosure.

Figure 8:
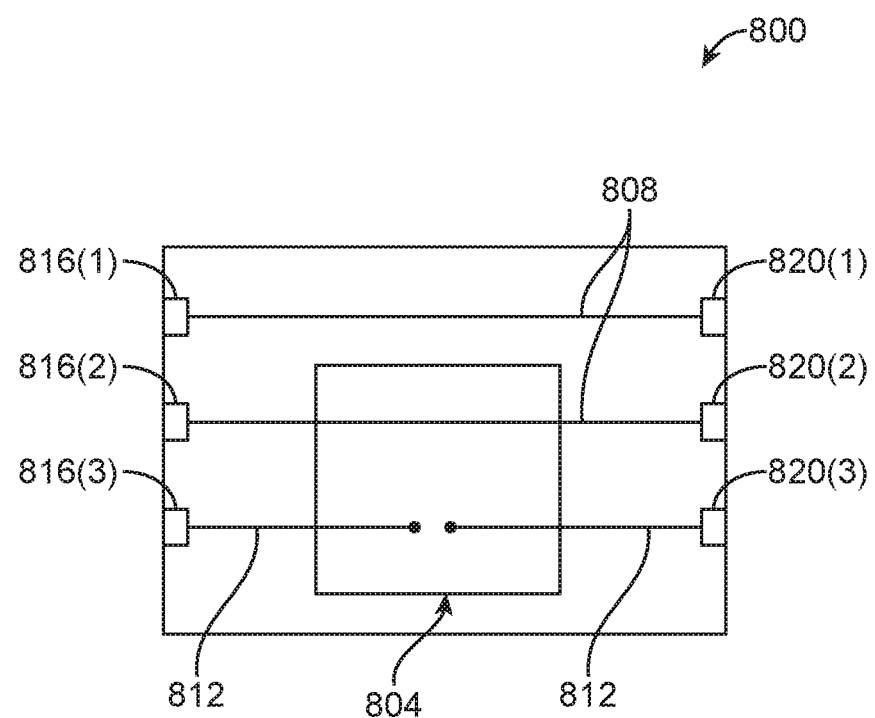
FIG. 8 is a high-level block diagram of an active connector biscuit made in accordance with aspects of the present invention.

FIG. 8 illustrates an exemplary active connector biscuit 800 that has onboard electronics 804 for providing the connector biscuit with any one or more of a variety of functionalities, including, but are not limited to, signal processing (e.g., conditioning, conversion, amplification, etc.), signal routing, power conversion (e.g., stepping voltage/current) and power distribution, serializing, deserializing, communications with offboard controllers, communications with other connector biscuits, and any combination thereof. Correspondingly, examples of onboard electronics 804 include, but are not limited to, one or more signal processors, one or more signal routers, one or more power converters, one or more serializers, one or more deserializers, one or more power distribution systems, and one or more communications devices (such as RF, microwave, or optical transmitters, receivers, or transceivers), and any combination thereof needed to satisfy any particular functionality or set of functionalities a designer provides to connector biscuit 800. Fundamentally, there is not limitation on the nature and character of onboard electronics 804 other that it can be physically incorporated into connector biscuit 800. Onboard electronics 804 may be powered in any suitable manner, such as by one or more wired or wireless power sources and/or power source (not shown) located onboard connector biscuit 800.

Depending on the operating principle(s) on which the display mosaic system, such as any one of the systems disclosed herein, in which connector biscuit 800 is deployed, connector biscuit 800 may include zero or more pass-through channels 808 that pass through one or more corresponding signals either directly, i.e., by "bypassing" onboard electronics 804, or indirectly through the onboard electronics, for example, for processing, conditioning, serializing, deserializing, etc. In addition, or alternatively, connector biscuit 800 may include zero or more "hub" channels 812 that each carry one or more signals from an onboard receiver (transceiver), onboard power source, and/or wireless power source, etc., that make up all or part of onboard electronics 804 to one or each display tile (not shown), such as any one or more of the display tiles described herein, to which the connector biscuit is operatively connected. In addition, or alternatively to one, the other, or both, of pass-through channel(s) 808 and receiving-type hub channels 812, connector biscuit 800 may include zero or more transmitting-type hub channels (also represented by hub channels 812) that each carry one or more signals to an onboard transmitter (transceiver) that makes up all or part of onboard electronics from one or each display tile (not shown) to which the connector biscuit is operatively connected.

All signal and/or power communications between connector biscuit 800 and each display tile (not shown) with which the connector biscuit is in operative communication may be via one or more interface points, such as interface points 816(1) to 816(4) and 820(1) to 820(4), that are operationally matched with corresponding interface points (not shown) on the display tile(s) to which he connector biscuit is operatively connected. Examples of interface points suitable for each/any of interface points 816(1) to 816(4) and 820(1) to 820(4) include, but are not limited to, electrical contacts for wired modes, optical emitters and corresponding optical detectors for optical modes, RF transmitters and receivers for RF modes, microwave transmitters and receivers for microwave modes, and electromagnets and induction coils for magnetic induction modes, among others. Those skilled in the art will readily understand how to implement operationally matched interface points 816(1) to 816(4) and 820(1) to 820(4) on connector biscuit 800 for any chosen communications and/or power transmission mode.

Figure 9A:
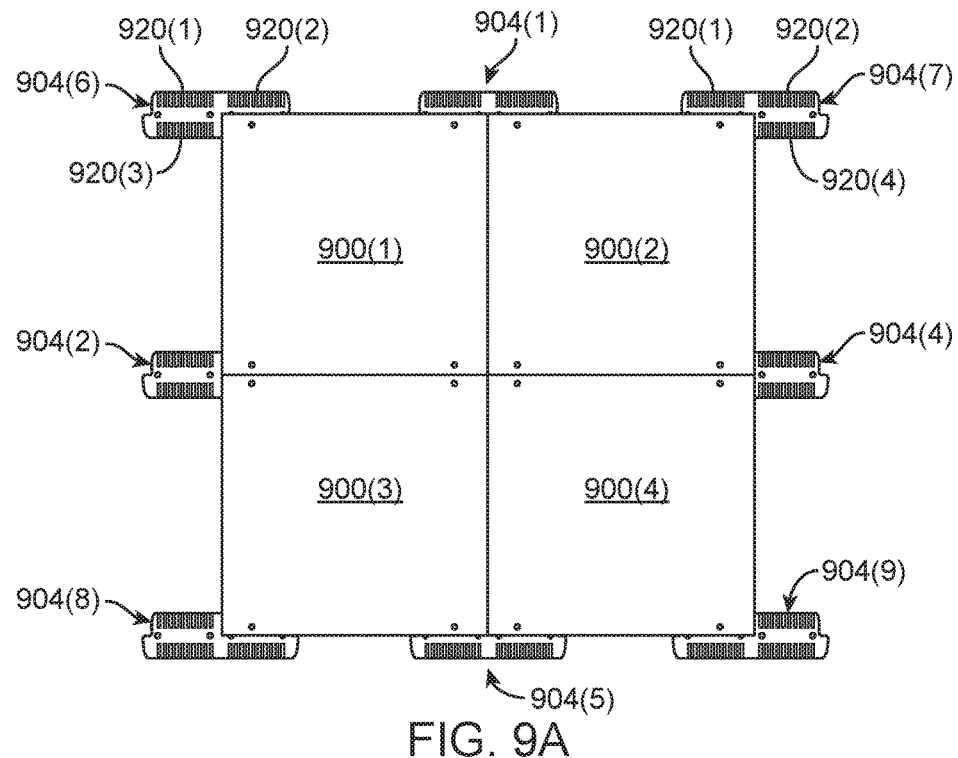
FIG. 9A is a front elevational view of a portion of a mosaicked display in which the display tiles have recessed receptacles located at their corners and designed and configured to engage corresponding connector biscuits.
Figure 9B:
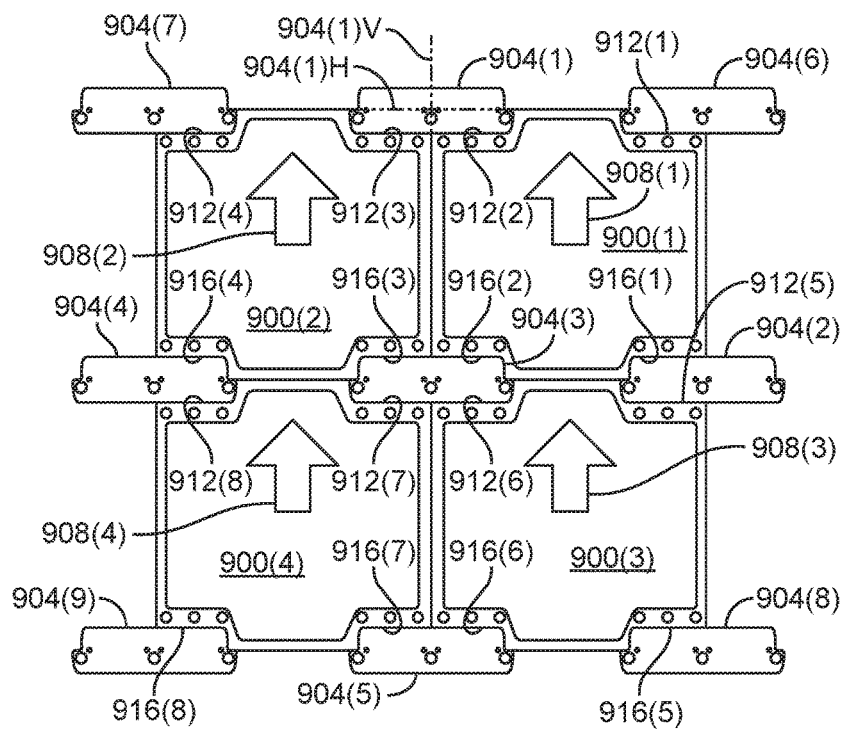
FIG. 9B is a rear elevational view of the portion of the mosaicked display of FIG. 9A, showing the back sides of the display tiles and connector biscuits.

FIGS. 9A and 9B illustrate four display tiles 900(1) to 900(4) mosaicked together using five connector biscuits 904(1) to 904(5) to form a portion of a larger mosaicked display (not shown). Four additional connector biscuits 904(6) to 904(9) are shown engaged with corresponding respective ones of display tiles 900(1) to 900(4) for interconnecting the display tiles with other display tiles and/or other type(s) of electronic modules (not shown), such as power and/or driver modules. In this example, each connector biscuit 904(1) to 904(9) has only one axis of symmetry, here its vertical axis, such as vertical axis 904(1)V (FIG. 9B) for connector biscuit 904(1). Each connector biscuit 904(1) to 904(9) is asymmetrical about its horizontal axis, such as horizontal axis 904(1)H (FIG. 9B) for connector biscuit 904(1). This is so in this particular design because display tiles 900(1) to 900(4) are designed and configured to be deployed in a particular orientation as indicated by directional arrows 908(1) to 908(4) (FIG. 9B) on the display tiles that indicate which edges of the tiles are to be at the top. Correspondingly, upper recessed receptacles 912(1) to 912(8) at the upper corners of display tiles 900(1) to 900(4) and lower recessed receptacles 916(1) to 916(8) at the lower corners of the display tiles are suitable sized and shaped to snugly engage the corresponding respective portions of the corresponding connector biscuits 904(1) to 904(9) to properly align the display tiles with one another. Specifically in this example, each upper recessed receptacle 912(1) to 912(8) is longer that each lower recessed receptacle 916(1) to 916(8) to accommodate the longer portions of the connector biscuits.

In this example, connector biscuits 904(1) to 904(9) are identical to one another and each includes four interface points 920(1) to 920(4) (only some labeled for convenience) for interfacing with four display tiles (like display tiles 900(1) to 900(4)) or fewer than four display tiles and one or more other electronic module(s). Also in this example, each interface point 920(1) includes a multi-contact electrical connector having 24 contact members for electrically contacting 24 matching contact members within each recessed receptacle 912(1) to 912(8) and 916(1) to 916(8). The electrical connectivity of interface points 920(1) to 920(4) depends on the design of display tiles 900(1) to 900(4) themselves as well as the overall mosaicked display system (not shown) of which they are part. Those skilled in the art will readily understand how to interconnect interface points 920(1) to 920(4) with one another according to the design parameters and/or how to connect the interface points with onboard electronics (not shown), if any, such as in any of the manners described elsewhere herein.

Figure 10:
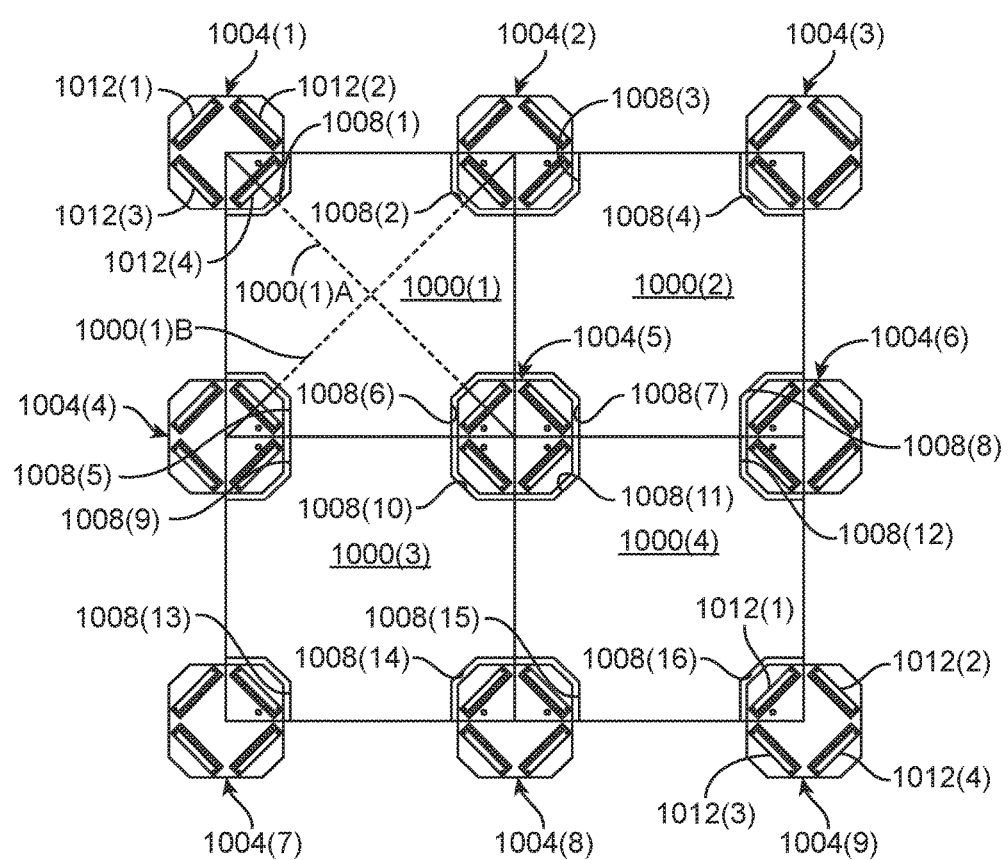
FIG. 10 is a front elevation/schematic diagram illustrating a portion of a mosaicked display in which the display tiles (illustrated as being translucent for sake of illustration) have alternative recessed receptacles located at their corners and designed and configured to engage corresponding rotationally symmetric connector biscuits.

FIG. 10 illustrates another configuration of corner-connected display tiles, here display tiles 1000(1) to 1000(4), in which the connector biscuits used to interconnect the display tiles, here connector biscuits 1004(1) to 1004(9), are rotationally symmetric about their centers of gravity. Correspondingly, each display tile 1000(1) to 1000(4) includes four recessed receptacles 1008(1) to 1008(16), each of which is physically symmetrical about a corresponding tile diagonal, such as diagonals 1000(1)A and 1000(1)B of display tile 1000(1). In this example, connector biscuits 1004(1) to 1004(9) are identical to one another and each includes four interface points 1012(1) to 1012(4) (only some labeled for convenience) for interfacing with four display tiles (like display tiles 1000(1) to 1000(4)) or fewer than four display tiles and one or more other electronic module(s). In this example, each interface point 1012(1) to 1012(4) includes a multi-contact electrical connector having 24 contact members for electrically contacting 24 matching contact members within each recessed receptacle 1008(1) to 1008(16). The electrical connectivity of interface points 1012(1) to 1012(4) depends on the design of display tiles 1000(1) to 1000(4) themselves as well as the overall mosaicked display system (not shown) of which they are part. Those skilled in the art will readily understand how to interconnect interface points 1012(1) to 1012(4) with one another according to the design parameters and/or how to connect the interface points with onboard electronics (not shown), if any, such as in any of the manners described elsewhere herein.

Examples Using Hub-Type Connector Units

FIGS. 11A and 11B illustrate a mosaicked composite display 1100 composed of multiple display tiles, here 15 display tiles 1104(1) to 1104(15), connected together by connector units of the hub type, here, 5 hub connectors 1108(1) to 1108(5), made in accordance with aspects of the present invention. In this example, each display tile 1104(1) to 1104(15) are identical to one another and may be of any suitable type, such as any of the types noted above in the General Description section. Also in this example, display tiles 1104(1) to 1104(15) engagingly abut one another to form an essentially continuous composite display having only very thin seams 1112 (only a few labeled to avoid clutter) between adjacent ones of the tile modules. It is noted that while 15 display tiles 1104(1) to 1104(15) are shown, more or fewer tile modules can be used to create mosaicked composite displays of other sizes. As can be seen in FIG. 11A, hub connectors 1108(1) to 1108(5) are identical to one another and are configured in conjunction with the configurations of display tiles 1104(1) to 1104(15) so that the hub connectors can be deployed in any one of a variety of manners within mosaicked composite display 1100. In this example: hub connector 1108(1) is deployed to connect-together two display tiles 1004(1) and 1004(6); each of hub connectors 1108(2) and 1108(3) is deployed to connect-together four tiles (1104(2), 1104(3), 1104(7), and 1104(8) in the case of hub connector 1108(2) and tiles 1104(4), 1104(5), 1104(9), and 1104(10) in the case of hub connector 1108(3)); hub connector 1108(4) is deployed to connect-together three tiles 1104(11) to 1104(13); and hub connector 1108(5) is deployed to connect-together two tiles 1104(14) and 1104 (15).

FIG. 12 shows the backside of a display tile 1104 that is identical to each of display tiles 1104(1) to 1104(15). In this embodiment, display tile 1104 is designed and configured, including in its internal electronics (not show), to be deployed in only a single orientation as indicated by up-arrow 1200, which denotes that the tile module needs to be deployed in a display, such as mosaicked display 1100 of FIG. 11A, with the up-arrow pointing upward as shown. Also in this embodiment, display tile 1104 includes two identical electrical connector components 1204(1) and 1204 (2) that provide redundant electrical connection interfaces for the display tile. Each electrical connector component 1204(1) and 1204(2) is fixedly secured on the backside of display tile and may be any suitable type, such as a male or female component of an insulation-displacement connector (IDC) (e.g., a 20-pin IDC), among many others. Although not shown, each electrical connector component 1204(1) and 1204(2) is electrically connected to internal electronics (not shown) aboard display tile 1104 in a manner that allows the tile module to operate when either connector component, or both, is/are in use. For the sake of illustration only, FIG. 12 includes exemplary dimensions (in mm) that provide the deployment flexibility of corresponding hub connectors, here hub connectors 1108(1) to 1108(5), noted above and illustrated in FIG. 11A in which each hub connector can be deployed either vertically (as with each of hub connectors 1108(1) to 1108(3)) or horizontally (as with each of hub connectors 1108(4) and 1108(5)) and connecting-together two display tile modules (as with each of hub connectors 1108(1) and 1108(5), three display tile modules (as with hub connector 1108(4)), or four display tile modules (as with each of hub connectors 1108(2) and 1108(3).

FIG. 13 shows the front side of a hub connector 1108 that is identical to each of hub connectors 1108(1) to 1108(5). In this embodiment, hub connector 1108 is designed and configured (including in any internal electronics (not show), if any, to be deployed in either a vertical orientation or a horizontal orientation. In this connection, hub connector 1108 includes a base 1300 and eight identical electrical connector components 1304(1) to 1304(8), which provide eight electrical connection interfaces and may be any suitable electrical connector components, such as a male or female component of an IDC type (e.g., a 20-pin IDC), among many others. Of course, if electrical connector components 1304(1) to 1304(8) are of the male or female type, electrical connector components 1204(1) and 1204(2) will be of the opposite type so that they engage one another. In the embodiment shown, electrical connector components 1304(1) to 1304(8) are arranged in two groups 1304A and 1304B of four, with the four electrical connector components in each group being arranged in a square pattern. Other embodiments may include differing electrical connector components and/or may have electrical connector components arranged differently. However, a common feature of such alternative embodiments with embodiment shown is that the hub connectors are separate modules relative to the display tiles they are used to electrically connect together, they are typically hidden from view from the viewing side of the multi-tile panel of which they are part, and they are separate and distinct from any support structure that supports the multi-tile panel as a whole.

If electrical connector components 1304(1) to 1304(8) are of an IDC type and hub connector 1108 is of a passive type (i.e., does not include any onboard active electronics), the electrical connector components may all be electrically connected together so that all the electrical connector components can carry the same signals. In alternative embodiments, each electrical connector component 1304(1) to 1304(8) can be electrically connected to one or more others of the electrical connector components as the corresponding design may dictate. For example, electrical connector components 1304(1) and 1304(3) can be exclusively electrically connected together, electrical connector components 1304(5) and 1304(7) can be exclusively electrically connected together, and electrical connector components 1304(2), 1304(4), 1304(6), and 1304(8) can be exclusively electrically connected together. As another example, electrical connector components 1304(1), 1304(3), 1304(5), and 1304(7) can be electrically connected together separately from electrical connector components 1304(2), 1304(4), 1304(6), and 1304(8), which can all be electrically connected together.

For the sake of illustration only, FIG. 13 includes exemplary dimensions (in mm) that provide the deployment flexibility of corresponding hub connectors, here hub connectors 1108(1) to 1108(5), noted above and illustrated in FIG. 11A, in which each hub connector can be deployed either vertically (as with each of hub connectors 1108(1) to 1108(3)) or horizontally (as with each of hub connectors 1108(4) and 1108(5)) and connecting-together two display tile modules (as with each of hub connectors 1108(1) and 1108(5), three display tile modules (as with hub connector 1108(4)), or four display tile modules (as with each of hub connectors 1108(2) and 1108(3)). As those skilled in the art will readily appreciate, the dimensions of FIG. 13 are coordinated with the dimension of FIG. 12 to provide the multiple deployment options for hub connectors 1108(1) to 1108(5) illustrated in FIG. 11A. It is noted that in the context of FIGS. 13 and 11A, "horizontal" and "vertical" are based on the orientation of the long axis of each of hub connectors 1108(1) to 1108(5).

In this example, and as seen in FIG. 12, display tile 1104 has a square lateral periphery (here, 150 mm×150 mm), and the locations and spacing of electrical connector components 1204(1) and 1204(2) relative to the overall size of the display tile, in conjunction with the locations and arrangement of electrical connector components 1304(1) to 1304(8) (FIG. 13) of hub connector 1108, allows the hub connector to be deployed in either of two orientations, as illustrated in FIG. 11A, that are 90° apart from one another about an axis 1312 (FIG. 13) that is normal to a front face 1108A (FIG. 11B) of hub connector 1108. As seen in FIG. 11A, the rotational orientations relative to axis 1312 of hub connectors 1108(4) and 1108(5) are each 90° off of the rotational orientations of hub connectors 1108(1) to 1108(3). As noted in the previous paragraph, in this example the horizontal and vertical orientation options are the orientations that are 90° apart from one another.

Base 1300 may be any of a variety of structures to which electrical connector components, here electrical connector components 1304(1) to 1304(8), can be fixedly attached. For example, in some embodiments, base 1300 comprises a printed circuit board, which has integrally formed conductive traces that provide the electrical connections between/among electrical connector component 1304(1) to 1304(8). In alternative embodiments, base 1300 may have another construction, such as a box-like construction that allows ones of electrical connector components 1304(1) to 1304(8) to be electrically connected together using internal cables (e.g., ribbon cables) rather than traces of a printed circuit board. In other alternative embodiments, base 1300 may comprise a flat plate, with electrical connector components 1304(1) to 1304(8) affixed to a front side of the plate, with the electrical connections therebetween being provided on the backside of the plate. In some embodiments in which the hub connector does not need to provide support for the tile modules that it electrically connects together, the hub connector need not be rigid. In some embodiments, base 1300 of hub connector 1108 may optionally include one or more holding structures (not shown) that matingly receive a complementary holding structure component that holds a display tile, such as any one of display tiles 1104(1) to 1104(15) in firm engagement with the hub connector. As noted above, such holding structures that are separate and distinct from electrical connector components 1304(1) to 1304(8) may be used when the electrical connector components do not have the requisite holding power to hold each display tile. Examples of holding structures include, but are not limited to, magnets, hook and loop fastener components, snap-fit connectors, friction connectors, etc. In some embodiments, base 1300 of hub connector 1108 may optionally be provided with one or more securing means (not shown) for securing the hub connector to a support structure. Such securing means can be located on the back face (opposite front face 1108A shown in FIG. 13) of hub connector 1108. Examples of securing means include, but are not limited to, magnets, hook and loop fastener components, snap-fit connectors, friction connectors, etc.

Figure 14:
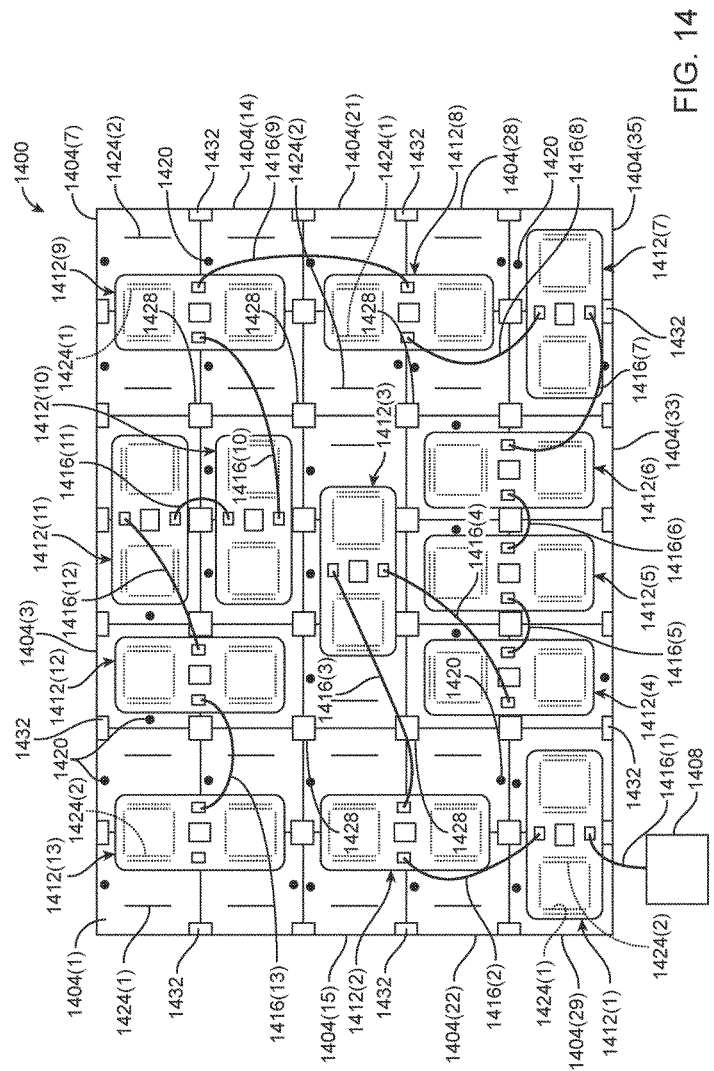
FIG. 14 is an elevational view of the backside of a mosaicked display system composed of display tiles connected together using hub connectors, wherein the display tiles are orientation sensitive.

Whereas FIG. 11A illustrates mosaicked composite display 1100 in which its display tiles 1104(1) to 1104(15) are orientation sensitive (as indicated by up-arrows 1200 (FIG. 12) on the display tiles), FIG. 14 illustrates a mosaicked composite display system 1400 in which its display tiles 1404(1) to 1404(35) (only some labeled to avoid clutter) are not sensitive to their rotational orientation. In FIG. 14, display tiles 1404(1) to 1404(35) are connected to a controller 1408 via a set of hub connectors, here, 13 hub connectors 1412(1) to 1412(13). In this embodiment, controller 1408 generates power and data signals and hub connectors 1412(1) to 1412(13) deliver these signals to display tiles 1404(1) to 1404(35) to enable mosaicked display system 1400 to display images to viewers on the opposite side of the mosaicked composite display shown in FIG. 14. Also in this example, controller 1408 and hub connectors 1412(1) to 1412(13) are daisy-chained together via connector cables 1416(1) to 1416(13) that carry the power and data signals from the controller to the hub connectors. It is noted that the power and data signal connectivity illustrated in FIG. 14 is merely illustrative and that other types of signal connectivity can be used. For example, connector cables 1416(1) to 1416(13) may carry only power, with data signals being provided wirelessly. In that case, each hub connector 1412(1) to 1412(13) may include an onboard wireless receiver or transceiver, which may be part of active electronics 1508 described below in conjunction with FIG. 15. As another example, daisy-chaining may be replaced by individually connecting hub connectors 1412(1) to 1412(13) to controller 1408 or other device. It is also noted that the number of display tiles 1404(1) to 1404(35) and the number of hub connectors 1412(1) to 1412(13) shown in FIG. 14 are merely illustrative and that any number of display tiles and any suitable number of hub connectors can be used for other mosaicked displays.

As mentioned above, each display tile 1404(1) to 1404(35) in mosaicked composite display system 1400 of FIG. 14 is not orientation sensitive, meaning that each display tile can be deployed in any one of four rotational orientations. For the sake of illustration, each display tile 1404(1) to 1404(35) includes a marking 1420 (only a few labeled to avoid clutter) that can be used to denote rotational orientation. When marking 1420 on a particular display tile 1404(1) to 1404(35) is at the top of the display tile (relative to FIG. 14), that orientation is arbitrarily denoted as a 0° orientation. Proceeding clockwise: when marking 1420 is on the righthand side of a display tile 1404(1) to 1404(35), that is a 90° orientation; when the marking is on the bottom of the display tile, that is a 180° orientation; and when the marking is on the left-hand side of the display tile, that is a 270° orientation. FIG. 14 illustrates all four rotational orientations among display tiles 1404(1) to 1404(35). Each display tile 1404(1) to 1404(35) may include an onboard orientation sensor (not shown) that allows that display tile, the corresponding hub connector 1412(1) to 1412(13), and/or controller 1408 to determine the deployed orientation of that display tile so that the portion of an image displayed by that display tile is oriented correctly. In this example, each display tile 1404(1) to 1404(35) has a pair of electrical connector components 1424(1) and 1424(2) (only a few labeled to avoid clutter) arranged in a manner that is the same as or similar to electrical connector components 1204(1) and 1204(2) of display tile 1104 of FIG. 12. In the case of each display tile 1404(1) to 1404(35) of FIG. 14, each electrical connector component 1424(1) and 1424(2) functions as an input to electronics (not shown) aboard each display tile.

Figure 15:
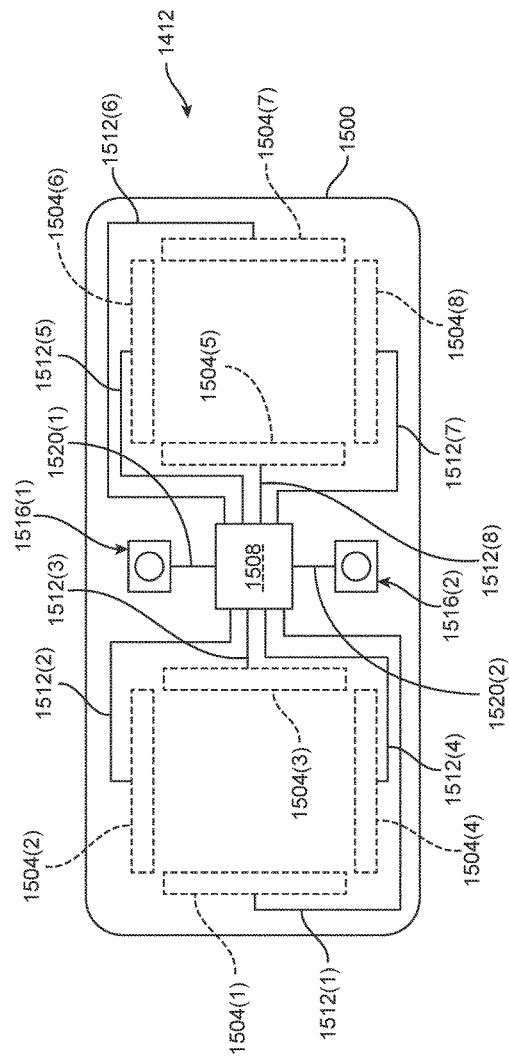
FIG. 15 is an enlarged diagrammatic view of one of the hub connectors of the mosaicked display system of FIG. 14.

FIG. 15 illustrates a hub connector 1412 that is identical to each of hub connectors 1412(1) to 1412(13) of FIG. 14. Referring to FIG. 15, hub connector 1412 includes a PCB 1500 to which are mounted eight electrical connector components 1504(1) to 1504(8) that are complementary to electrical connector components 1424(1) and 1424(2) (FIG. 14) on display tiles 1404(1) to 1404(35). In this example, the arrangement and spacing of electrical connector components 1504(1) to 1508(8) on hub connector 1412 (FIG. 15) and the arrangement and spacing of electrical connector components 1424(1) and 1424(2) (FIG. 14) on each display tile 1404(1) to 1404(35) follow the basic principles described above in connection with FIGS. 11A to 13 to allow each instantiation of hub connector 1412 to be engaged with two, three, or four of the display tiles, depending, among other things, on the orientations of the electrical connector components on adjacent ones of the display tiles and the deployment strategy for the hub connectors. In this example, each of electrical connector components 1504(1) to 1504(8) (FIG. 15) is an output component that can be mated with a corresponding one of electrical connector components 1424(1) and 1424(2) (FIG. 14) on any one of display tiles 1404(1) to 1404(35). Each of electrical connector components 1424(1), 1424(2), and 1504(1) to 1504(8) may be an IDC, among any other suitable type.

In the embodiment of FIG. 15, hub connector 1412 includes active electronics 1508, at least a portion of which is in operative communication with each of electrical connector components 1504(1) to 1504(8). Active electronics 1508, such as in the form of one or more chips and/or other electronic components, may be mounted to PCB 1500 on the opposite side and/or same side as the electrical connector components 1504(1) to 1504(8) and are in electrical communication with each of the electrical connector components via traces (not shown, but connections schematically shown at elements 1512(1) to 1512(8)) that are integral to the PCB in a manner well known in the art. Hub connector 1412 also includes a pair of cable receivers 1516(1) and 1516(2) for receiving corresponding ones of connector cables, such as connector cables 1416(1) to 1416(13) (FIG. 14). In this example, cable receivers 1516(1) and 1516(2) are connected in a manner that allows the daisy-chaining of hub connectors 1412(1) to 1412(13) noted above relative to FIG. 14. Electrical connections attendant to cable receivers 1516(1) and 1516(2) may be in the form of traces (not shown, but connection schematically shown at elements 1520(1) and 1520(2)) within PCB 1500. Cable receivers 1516(1) and 1516(2) may be of any suitable type to match the corresponding cables, such as multi-pin-type cable receivers, among others.

Active electronics 1508 of hub connector 1412 of FIG. 15 are electrically connected to cable receivers 1516(1) and 1516(2), as well as with electrical connector components 1504(1) to 1504(8) as noted above, and, in this embodiment, are configured to control which one(s) of the electrical connector components is/are active depending on whether or not the electrical connector components are engaged with electrical connector components 1424(1) and 1424(2) (FIG. 14) of display tiles 1404(1) to 1404(35). For example, active electronics 1508 may be designed and configured to sense physical engagement of each of electrical connector components 1504(1) to 1504(8) with a corresponding one of electrical connector components 1424(1) and 1424(2) (FIG. 14) or to sense electrical connectivity between each of electrical connector components 1504(1) to 1504(8) and electronics (not shown) aboard a display tile 1404(1) to 1404(35) to which it is connected in order to determine connectivity. Active electronics 1508 may also be provided with additional functionality, such as determining an identification of each display tile 1404(1) to 1404(35) (FIG. 14) to which the corresponding hub connector 1412(1) to 1412(13) is connected and/or determine the rotational orientation of each display tile to which that hub connector is connected, among other things.

Referring again to FIG. 14, in this example, display tiles 1404(1) to 1404(35) are mechanically and rigidly connected together with one another via a plurality of corner connectors, here of two types, namely a four-corner-type connector 1428 and a two-corner-type connector 1432 (only a few of each type labeled to avoid clutter). As their names imply, each four-corner-type connector 1428 connects-together four display tiles 1404(1) to 1404(35) where four of their corners meet, and each two-corner-type connector 1432 connects-together two display tiles where two of their corners meet. Each of two-corner-type connectors 1432 and four-corner-type connectors 1428 is removably and rigidly securable to the corresponding display tiles 1404(1) to 1404(35) so as to properly align the abutting display tiles with one another along all axes. The mechanisms used to secure each of two-corner-connectors 1432 and four-corner-type connectors 1428 to corresponding display tiles 1404(1) to 1404(35) may be any suitable mechanisms, such as the locking mechanisms disclosed in U.S. patent application Ser. No. 15/429,042 filed on Feb. 9, 2017, and titled "ARCHITECTURAL PANEL SYSTEM COMPOSED OF A COMBINATION OF SENSORY OUTPUT TILE MODULES AND NON-SENSORY-OUTPUT TILE MODULES, AND COMPONENTS THEREFOR", which is incorporated herein by reference for its disclosure of corner connectors, including FIGS. 11 to 22 and corresponding descriptions. Fundamentally, there is no limitation on the type of mechanism(s) used for securing two-corner-connectors 1432 and four-corner-type connectors 1428 to corresponding display tiles 1404(1) to 1404(35) and for assuring proper alignment of the display tiles with one another. When such corner connectors 1428, 1432 are used, hub connectors 1412(1) to 1412(13) do not need to provide alignment functionality for display tiles 1404(1) to 1404(35), but they may provide support for them if so configured. It is noted that hub connector 1412 (FIG. 15), display tiles 1404(1) to 1404(35), and/or four-corner-type connectors 1428 may be configured so that a hub connector can span over a four-corner connector while still being properly electrically connected to corresponding display tiles, depending on the manner in which the hub connector is engaged with a set of display tiles. For example, hub connectors 1412(1), 1412(5), 1412(6), and 1412(12) are each connected to four corresponding ones of display tiles 1404(1) to 1404(35) so that they span over four-corner-type connectors 1428, whereas the rest of the hub connectors are connected to the display tiles in manners that do not require such spanning-over. It is noted that while hub connectors 1412(1) to 1412(13) are illustrated as being deployed with non-orientation sensitive display tiles 1404(1) to 1404(35), these hub connectors, as well as other hub connectors made in accordance with the present invention, can be used with orientation-sensitive display tiles, such as display tiles 1104(1) to 1104(15) of FIG. 11A, among others.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electronic display system, comprising:
a plurality of display tiles designed and configured to abut one another so as to form a mosaicked display when the display tiles are deployed in the mosaicked display, the mosaicked display having a viewing face, wherein each display tile includes:
 onboard electronics for operating the display tile;
 a periphery designed and configured to conformally abut a like periphery of another one of the display tiles;
 a first front side that forms part of the viewing side of the mosaicked display when the display tile is deployed in the mosaicked display;
 a first backside spaced from the first front side; and
 first and second electrical connection interfaces located on the first backside and spaced from one another, wherein the first and second electrical interface points provide redundant electrical connectivity to the onboard electronics; and
a plurality of connector units separate and distinct from one another and from each of the plurality of display tiles, wherein each connector unit includes:
 a second front side designed and configured to confront at least a pair of the display tiles when the connector unit is deployed for use in the mosaicked display; and
 third and fourth electrical connection interfaces located on the second front side and arranged to functionally engage corresponding respective ones of the first and second electrical connection interfaces of a pair of the display tiles when the connector unit is deployed for use in the mosaicked display;
wherein, when the plurality of display tiles and the plurality of connector units are deployed to form the mosaicked display, any one of the display tiles can be removed from the mosaic display and disengaged from at least one of the connector units by moving the display tile only in a direction normal to the viewing face of the mosaicked display at the display tile;
further wherein:
 the first electrical connection interface comprises a first electrical connector component located proximate to but spaced from a first edge of the display tile;
 the second electrical connection interface comprises a second electrical connector component located proximate to but spaced from a second edge of the display tile;
 each connector unit is a hub connector that includes a base having the second front side;
 the third electrical connection interface comprises a third electrical connector component matingly complementary to each of the first and second electrical connector components;
 the fourth electrical connection interface comprises a fourth electrical connector component matingly complementary to each of the first and second electrical connector components;
 the third and fourth electrical connector components are spaced from one another so that, when the hub connector is deployed in the electronic display system to connect together first and second ones of the display tiles having the first and second edges abutting one another:
  the third electrical connector component matingly engages one of the first and second electrical connector components of a first one of the display tiles;
  the fourth electrical component matingly engages one of the first and second electrical connector components of a second one of the display tiles when the first and second display tiles are abutting one another; and
  the first and second edges remain abutting one another; and
 the hub connector is held in engagement with the first and second display tiles at least in part by mating engagement of the third and fourth electrical connector components with corresponding respective ones of the first and second electrical connector components of the first and second display tiles.

2. The electronic display system according to claim 1, wherein:
each hub connector comprises first and second groups of electrical connector components on the second front side of the base and spaced from one another,
the first group of electrical connector components includes four electrical connector components arranged in a first rectangular pattern and each being complementary to each of the first and second electrical connector components of each of the display tiles; and
the second group of electrical connector components includes four electrical connector components arranged in a second rectangular pattern and each being complementary to each of the first and second electrical connector components of each of the display tiles.

3. The electronic display system according to claim 2, wherein each hub connector includes a front face on the second front side, and each of the first and second electrical connector components are arranged and located on each of the display tiles and each of the electrical connector components in each of the first and second rectangular patterns are arranged and located on each of the hub connectors so that each hub connector can be deployed to electrically connect together the first and second display tiles in each of a first orientation and a second orientation rotated 90° from the first orientation about an axis normal to the front face of the hub connector.

4. The electronic display system according to claim 3, wherein the base comprises a printed circuit board having conductive traces electrically connecting together ones of the electrical connector component in both of the first and second groups.

5. The electronic display system according to claim 3, wherein each of the first and second electrical connector components and each of the electrical connector components in each of the first and second rectangular patterns are insulation-displacement connectors.

6. The electronic display system according to claim 2, wherein each of the first and second electrical connector components are arranged and located on each of the display tiles and each of the electrical connector components in each of the first and second rectangular patterns are arranged and located on each hub connector so that each hub connector can be deployed to electrically connect together three of the display tiles that are abutting one another along a straight line.

7. The electronic display system according to claim 6, wherein the base comprises a printed circuit board having conductive traces electrically connecting together ones of the electrical connector component in both of the first and second groups.

8. The electronic display system according to claim 6, wherein each of the first and second electrical connector components and each of the electrical connector components in each of the first and second rectangular patterns are insulation-displacement connectors.

9. The electronic display system according to claim 1, wherein the base comprises a printed circuit board having conductive traces electrically connecting together the third and fourth electrical connector components.

10. The electronic display system according to claim 1, wherein each of the first through fourth electrical connector components are insulation-displacement connectors.

11. The electronic display system according to claim 1, wherein each of the hub connectors has a second backside spaced from the second front side and further has at least one securing means for securing the hub connector to a support structure.

12. The electronic display system according to claim 1, wherein each hub connector includes active electronics in electrical communication with each of the third and fourth electrical connector components.

13. The electronic display system according to claim 12, wherein the active electronics are designed and configured to determine whether or not each of the third and fourth electrical connector components is connected to a display tile of the plurality of display tiles.

14. The electronic display system according to claim 13, wherein the active electronics are designed and configured to control signals directed to the third and fourth electrical connector components based on determining connectivity to a display tile.

15. The electronic display system according to claim 12, wherein each hub connector includes a first cable receiver in electrical communication with the active electronics, the first cable receiver designed and configured to connect the hub connector to a cable that carries power and data signals to the hub connector for driving each of the display tiles to which the hub connector is connected.

16. The electronic display system according to claim 15, wherein each hub connector includes a second cable receiver in electrical communication with the active electronics, the first and second cable receivers designed and configured to allow the hub connectors to be daisy-chained together.

17. An electronic display system, comprising:
a plurality of display tiles designed and configured to abut one another so as to form a mosaicked display when the display tiles are deployed to form the mosaicked display, the mosaicked display tile having a viewing face;
wherein each display tile includes:
onboard electronics for operating the display tile;
a periphery designed and configured to conformally abut a like periphery of another one of the display tiles, the periphery including first and second edges, the first edge being parallel to and spaced from the second edge by a distance D;
a front side that forms part of the viewing face of the mosaicked display when the display tile is deployed in the mosaicked display;
a backside spaced from the first front side; and
first and second electrical connectors located on the backside providing redundant electrical connectivity to the onboard electronics, wherein:
the first and second electrical connectors are configured identically to one another;
the first electrical connector has a longitudinal centerline parallel to each of the first and second edges;
the second electrical connector has a longitudinal centerline parallel to each of the first and second edges;
the longitudinal centerlines of the first and second electrical connectors are spaced apart by a distance of D/2;
the longitudinal centerline of the first electrical connector is spaced from the first edge by a distance of D/4; and
the longitudinal centerline of the second electrical connector is spaced from the second edge by a distance of D/4; and a plurality of hub connectors separate and distinct from one another and from each of the plurality of display tiles, wherein each hub connector includes:
a base having a front side;
at least one pair of third and fourth electrical connectors located on the front side of the base and having corresponding respective longitudinal centerlines parallel to one another and spaced apart by a distance of D/2, wherein each of the third and fourth electrical connectors is designed and configured to matingly engage each of the first and second electrical connectors when the base is moved in a direction perpendicular to the viewing face of the mosaicked display.

18. The electronic display system according to claim 17, wherein each of the connector hubs includes a second pair of third and fourth electrical connectors having corresponding respective longitudinal centerlines parallel to one another and spaced apart by a distance D/2.

19. The electronic display system according to claim 18, wherein the longitudinal centerlines of the third and fourth electrical connectors in the second pair are parallel to the longitudinal centerlines of the third and fourth electrical connectors in the first pair and are spaced apart by a distance D/2.

20. The electronic display according to claim 19, wherein the third and fourth electrical connectors in both the first and second pairs all have transverse centerlines coaxial with one another, and the longitudinal axes of each adjacent pair of the third and fourth electrical connectors are spaced apart by a distance of D/2.

21. The electronic display according to claim 19, wherein the third and fourth electrical connectors in each of the first and second pairs have transverse centerlines that are coaxial with one another, and the transverse centerlines of the first pair are spaced apart from the transverse centerlines of the second pair by a distance of D.

22. The electronic display system according to claim 18, wherein the longitudinal centerlines of the third and fourth electrical connectors in the first and second pairs are arranged to form a first square arrangement of electrical connectors having a first rotational orientation relative to the base.

23. The electronic display system according to claim 22, further comprising a second square arrangement of electrical connectors identical to the first square arrangement, wherein the second square arrangement has a second rotational orientation relative to the base that is the same as the first rotational orientation, and the second square arrangement is spaced from the first square arrangement by a distance of D/2.

24. The electronic display system according to claim 17, wherein the base comprises a printed circuit board and each of the third and fourth electrical connectors is affixed to the printed circuit board.

25. The electronic display system according to claim 17, wherein the base further comprises cable connectors that allow the plurality of hub connectors to be daisy chained together relative to at least a video signal for driving the mosaicked display.

* * * * *